United States Patent
Wang et al.

(10) Patent No.: US 10,735,063 B2
(45) Date of Patent: *Aug. 4, 2020

(54) METHOD FOR REPORTING CHANNEL STATE INFORMATION, USER EQUIPMENT, AND BASE STATION

(71) Applicant: HUAWEI TECHNOLOGIES CO.,LTD., Shenzhen, Guangdong (CN)

(72) Inventors: Jianguo Wang, Beijing (CN); Yongxing Zhou, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/594,646

(22) Filed: Oct. 7, 2019

(65) Prior Publication Data
US 2020/0044700 A1 Feb. 6, 2020

Related U.S. Application Data

(63) Continuation of application No. 16/058,636, filed on Aug. 8, 2018, now Pat. No. 10,447,356, which is a (Continued)

(51) Int. Cl.
*H04B 7/04* (2017.01)
*H04B 7/0456* (2017.01)
(Continued)

(52) U.S. Cl.
CPC ......... *H04B 7/0456* (2013.01); *H04B 7/0417* (2013.01); *H04B 7/0473* (2013.01); *H04B 7/0626* (2013.01); *H04B 7/0639* (2013.01)

(58) Field of Classification Search
CPC .. H04B 7/0456; H04B 7/0417; H04B 7/0473; H04B 7/0626; H04B 7/0639;
(Continued)

(56) References Cited

U.S. PATENT DOCUMENTS

| 8,787,481 B2* | 7/2014 | Jongren | ............... H04B 7/0417 375/267 |
| 2011/0261894 A1* | 10/2011 | Yu | ........................ H04B 7/0456 375/267 |
| 2014/0341312 A1* | 11/2014 | Lee | ........................... H04L 1/06 375/267 |

* cited by examiner

*Primary Examiner* — Tesfaldet Bocure
(74) *Attorney, Agent, or Firm* — James Anderson Harrison

(57) ABSTRACT

Embodiments of the present invention provide a method includes: receiving a reference signal sent by a base station; selecting, based on the reference signal, a precoding matrix from a codebook, where a precoding matrix W included in the codebook is a product of three matrices being $W_1$, Z, and $W_2$, that is, $W=W_1ZW_2$, where both $W_1$ and Z are block diagonal matrices, $W_1$=a formula (I), Z=a formula (II), each of $W_1$ and Z includes at least one block matrix, that is, $N_B \geq 1$, and each column of each block matrix $Z_i$ in the matrix Z has the following structure formula (III); and sending a precoding matrix indicator PMI to the base station, where the PMI corresponds to the selected precoding matrix, and is used by the base station to obtain the selected precoding matrix W according to the PMI.

20 Claims, 3 Drawing Sheets

Related U.S. Application Data continuation of application No. 15/808,318, filed on Nov. 9, 2017, now Pat. No. 10,063,296, which is a continuation of application No. 15/439,686, filed on Feb. 22, 2017, now Pat. No. 9,838,097, which is a continuation of application No. 14/883,334, filed on Oct. 14, 2015, now Pat. No. 9,608,708, which is a continuation of application No. PCT/CN2013/074214, filed on Apr. 15, 2013.

(51) Int. Cl.
*H04B 7/06* (2006.01)
*H04B 7/0417* (2017.01)

(58) Field of Classification Search
CPC .. H04B 7/0486; H04B 7/0617; H04B 7/0413; H04B 7/0619; H04B 7/066; H04B 7/0404; H04B 7/0663; H04B 7/046; H04L 1/0026; H04L 2025/03426; H04L 27/2636; H04W 24/10
See application file for complete search history.

METHOD FOR REPORTING CHANNEL STATE INFORMATION, USER EQUIPMENT, AND BASE STATION

CROSS-REFERENCE TO RELATED APPLICATIONS

This application is a continuation of U.S. patent application Ser. No. 16/058,636, filed on Aug. 8, 2018, now issued as U.S. Pat. No. 10,447,356 on Oct. 15, 2019, which is a continuation of U.S. patent application Ser. No. 15/808,318, filed on Nov. 9, 2017, now issued as U.S. Pat. No. 10,063,296 on Aug. 28, 2018, which is a continuation of U.S. patent application Ser. No. 15/439,686, filed on Feb. 22, 2017, now issued as U.S. Pat. No. 9,838,097 on Dec. 5, 2017, which is a continuation of U.S. patent application Ser. No. 14/883,334, filed on Oct. 14, 2015, now issued as U.S. Pat. No. 9,608,708 on Mar. 28, 2017, which is a continuation of International Application No. PCT/CN2013/074214, filed on Apr. 15, 2013. All of the afore-mentioned patent applications are hereby incorporated by reference in their entireties.

TECHNICAL FIELD

The present invention relates to the field of communications technologies, and in particular, to a method for reporting channel state information, user equipment, and a base station.

BACKGROUND

In a multiple input multiple output (MIMO) system, to eliminate co-channel interference caused by multiple users and multiple antennas, some necessary signal processing technologies need to be used at two ends of a transceiver, so as to improve communication performance of the system.

In the prior art, a precoding technology is proposed, and a major principle of the precoding technology is that a base station uses known channel state information (CSI) to design a precoding matrix for processing a sent signal, so as to reduce interference on the sent signal. A MIMO system using precoding may be represented as follows:

$$y=HVs+n$$

where Y is a received signal vector, H is a channel matrix, V is a precoding matrix, s is a transmitted symbol vector, and n is an interference and noise vector.

Optimal precoding usually requires that a transmitter entirely knows channel state information (CSI). In a common method, a terminal quantizes instantaneous CSI and feeds back the instantaneous CSI to a base station (BS).

In an existing long term evolution (LTE) R8 system, CSI information fed back by a terminal includes information such as a rank indicator (RI), a precoding matrix indicator (PMI), and a channel quality indicator (CQI), where the RI and the PMI respectively indicate a used layer quantity and a used precoding matrix. A set of used precoding matrices is generally referred to as a codebook, where each precoding matrix is a code word in the codebook. An existing LTE R8 4-antenna codebook is designed based on a Householder transformation, and a code word of the codebook may be compatible with a uniform linear array antenna configuration and a cross polarization antenna configuration. Double-codebook design for 8 antennas is introduced in an LTE R10 system, and quantization accuracy is further improved without excessively increasing feedback overheads.

On one hand, the foregoing LTE R8 to R10 codebooks are mainly designed for a macro cell system. A position of a base station or a transmitter is usually higher than the height of a surrounding building (for example, the height of an antenna is approximately between 200 to 250 feet); therefore, a major transmission path of the base station or the transmitter is higher than a roof, and a transmitted multipath component usually surrounds a direction of a line of sight (Line of Sight, LOS for short). In this way, each multipath component is usually located within a plane in which the line of sight is located, that is, angle extension in a pitch angle direction approaches 0. On the other hand, the foregoing codebooks are designed based on a conventional base station antenna; for the conventional base station antenna, a perpendicular antenna beam having a fixed tilt angle is used, but only a direction of a horizontal beam can be adjusted dynamically.

However, to conform to user density and a data service demand that are increasing rapidly, and to further reduce transmit power, the concept of micro cell is further introduced. A position of a base station or a transmitter in a micro cell system is usually lower than the height of a surrounding building (for example, an antenna is installed on a lamppost in a street, and usually is at a height of approximately 30 feet), and a wireless transmission mechanism of the micro cell system is obviously different from the foregoing macro cell environment, where some multipath components may surround a LOS direction, and some other multipath components are probably along the ground or the street. This double-transmission mechanism causes larger angle extension, especially in a direction of a pitch angle, which is obviously different from the macro cell. Currently, design of LTE R8-R10 codebooks cannot be well adapted to the foregoing micro cell environment.

In addition, to further improve spectrum efficiency, currently, in an LTE R12 standard to be launched, introduction of more antenna configurations, especially an antenna configuration based on an active antenna system (AAS), starts to be considered. Different from a conventional base station, an AAS base station further provides freedom in designing an antenna in a perpendicular direction, which is mainly implemented by using a two-dimensional antenna array in horizontal and perpendicular directions of the antenna; the conventional base station actually uses a horizontal one-dimensional array, although each antenna port in a horizontal direction of the antenna may be obtained by performing weighting on multiple array elements in a perpendicular direction. Currently, the design of the LTE R8-R10 codebooks cannot be well adapted to the foregoing antenna configuration.

SUMMARY

Embodiments of the present invention provide a method for reporting channel state information, user equipment, and a base station. In a precoding matrix indicated in the channel state information reported by the user equipment, a channel characteristic of a double-transmission condition in a micro cell network environment and freedom in horizontal and perpendicular directions of an antenna of an AAS base station are considered, which can improve communication performance of the micro cell network environment and an AAS base station system.

To achieve the foregoing objective, the following technical solutions are used in the embodiments of the present invention:

According to a first aspect, an embodiment of the present invention provides a method for reporting channel state information, where the method includes:

receiving a reference signal sent by a base station;

selecting, based on the reference signal, a precoding matrix from a codebook, where a precoding matrix W included in the codebook is a product of three matrices being $W_1$, Z, and $W_2$, that is, $W=W_1ZW_2$, where both $W_1$ and Z are block diagonal matrices, $W_1=\text{diag}\{X_1, \ldots, X_{N_B}\}$, $Z=\text{diag}\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T \quad \beta_{i,k}e^{j\theta_{i,k}}e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, and $\beta_{i,k} \geq 0$; and sending a precoding matrix indicator PMI to the base station, where the PMI corresponds to the selected precoding matrix, and is used by the base station to obtain the selected precoding matrix W according to the PMI.

In a first possible implementation manner, with reference to the first aspect, the selecting, based on the reference signal, a precoding matrix from a codebook specifically includes:

selecting, based on the reference signal, the precoding matrix from a codebook subset, where the codebook subset is a subset predefined, or notified by the base station, or reported by user equipment.

In a second possible implementation manner, with reference to the first possible implementation manner, the codebook subsets share at least one same matrix subset of the following matrix subsets: subsets of a matrix $W_1$, a matrix $W_1Z$, a matrix $W_2$, a matrix $ZW_2$, and a matrix Z.

In a third possible implementation manner, with reference to the first aspect or the first and second possible implementation manners, the sending a precoding matrix indicator PMI to the base station specifically includes:

sending a first precoding matrix indicator $PMI_1$ and a second precoding matrix indicator $PMI_2$ to the base station, where the $PMI_1$ is used to indicate the matrix $W_1Z$, and the $PMI_2$ is used to indicate the matrix $W_2$; or sending a third precoding matrix indicator $PMI_3$ and a fourth precoding matrix indicator $PMI_4$ to the base station, where the $PMI_3$ is used to indicate the matrix $W_1$, and the $PMI_4$ is used to indicate the matrix $ZW_2$; or sending a second precoding matrix indicator $PMI_2$, a third precoding matrix indicator $PMI_3$, and a fifth precoding matrix indicator $PMI_5$ to the base station, where the PMI5 is used to indicate the matrix Z.

In a fourth possible implementation manner, with reference to the third possible implementation manner, the sending a precoding matrix indicator PMI to the base station specifically includes:

sending the $PMI_1$ to the base station according to a first period; and sending the $PMI_2$ to the base station according to a second period, where the first period is greater than the second period; or sending the $PMI_3$ to the base station according to a third period; and sending the $PMI_4$ to the base station according to a fourth period, where the third period is greater than the fourth period; or sending the $PMI_2$ to the base station according to a second period;

sending the $PMI_3$ to the base station according to a third period; and sending the $PMI_5$ to the base station according to a fifth period, where the third period is less than the second period and the fifth period.

In a fifth possible implementation manner, with reference to the third possible implementation manner, the sending a precoding matrix indicator PMI to the base station specifically includes:

sending the $PMI_1$ to the base station according to a first frequency domain granularity; and sending the $PMI_2$ to the base station according to a second frequency domain granularity, where the first frequency domain granularity is greater than the second frequency domain granularity; or sending the $PMI_3$ to the base station according to a third frequency domain granularity; and sending the $PMI_4$ to the base station according to a fourth frequency domain granularity, where the third frequency domain granularity is greater than the fourth frequency domain granularity; or sending the $PMI_2$ to the base station according to a second frequency domain granularity;

sending the $PMI_3$ to the base station according to a third frequency domain granularity; and sending the $PMI_5$ to the base station according to a fifth frequency domain granularity, where the third frequency domain granularity is less than the second frequency domain granularity and the fifth frequency domain granularity.

In a sixth possible implementation manner, with reference to the first aspect or the first to fifth possible implementation manners, the block matrix $X_i=[X_{i,1}\ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a seventh possible implementation manner, with reference to the sixth possible implementation manner, each column of the matrix $X_{i,j}$, j=1, 2 is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

In an eighth possible implementation manner, with reference to the first aspect or the first to fifth possible implementation manners, the block matrix $X_i=[X_{i,1}\ X_{i,2}]$, where the matrix $X_{i,j}$ is a Kronecker product of two matrices being $A_{i,j}$ and $B_{i,j}$, and j=1, 2.

In a ninth possible implementation manner, with reference to the eighth possible implementation manner, columns of the matrix $X_{i,1}$ and the matrix $X_{i,2}$ are column vectors of a Householder matrix, a DFT matrix, a Hadamard matrix, a rotated Hadamard matrix, or a precoding matrix in an LTE R8 system 2-antenna or 4-antenna codebook or in an LTE R10 system 8-antenna codebook.

In a tenth possible implementation manner, with reference to the first aspect or the first to ninth possible implementation manners, $W_1$ is an identity matrix.

In an eleventh possible implementation manner, with reference to the first aspect or the first to tenth possible implementation manners, a column vector in the matrix $W_2$ has a structure $y_n = \gamma^{-1}[e_n^T \ e^{j\theta_n}e_n^T]^T$, where $e_n$ represents a selection vector; where in the vector, the $n^{th}$ element is 1 and all other elements are 0; $\theta_n$ is a phase shift; and $\gamma$ is a positive constant.

According to a second aspect, an embodiment of the present invention provides a method for reporting channel state information, where the method includes:

sending a reference signal to user equipment UE;

receiving a precoding matrix indicator PMI sent by the UE; and determining a precoding matrix W in a codebook according to the PMI, where the precoding matrix W is a product of three matrices being $W_1$, Z, and $W_2$, that is, $W = W_1 Z W_2$, where both $W_1$ and Z are block diagonal matrices, $W_1 = \text{diag}\{X_1, \ldots, X_{N_B}\}$, $Z = \text{diag}\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T \ \beta_{i,k}e^{j\theta_{i,k}} e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, and $\beta_{i,k} \geq 0$.

In a first possible implementation manner, with reference to the second aspect, the determining a precoding matrix W in a codebook according to the PMI specifically includes:

determining the precoding matrix in a codebook subset according to the PMI, where the codebook subset is a subset predefined, or reported by the user equipment, or notified by a base station.

In a second possible implementation manner, with reference to the first possible implementation manner, the codebook subsets share at least one same matrix subset of the following matrix subsets: subsets of a matrix $W_1$, a matrix $W_1 Z$, a matrix $W_2$, a matrix $Z W_2$, and a matrix Z.

In a third possible implementation manner, with reference to the second aspect or the first and second possible implementation manners, the receiving a precoding matrix indicator PMI sent by the UE specifically includes:

receiving a first precoding matrix indicator $PMI_1$ and a second precoding matrix indicator $PMI_2$ that are sent by the UE, where the $PMI_1$ is used to indicate the matrix $W_1 Z$, and the $PMI_2$ is used to indicate the matrix $W_2$;

or receiving a third precoding matrix indicator $PMI_3$ and a fourth precoding matrix indicator $PMI_4$ that are sent by the UE, where the $PMI_3$ is used to indicate the matrix $W_1$, and the $PMI_4$ is used to indicate the matrix $ZW_2$;

or receiving a second precoding matrix indicator $PMI_2$, a third precoding matrix indicator $PMI_3$, and a fifth precoding matrix indicator $PMI_5$ that are sent by the UE, where the $PMI_5$ is used to indicate the matrix Z.

In a fourth possible implementation manner, with reference to the third possible implementation manner, the receiving a precoding matrix indicator PMI sent by the UE specifically includes:

receiving, according to a first period, the $PMI_1$ sent by the UE; and receiving, according to a second period, the $PMI_2$ sent by the UE, where the first period is greater than the second period; or receiving, according to a third period, the $PMI_3$ sent by the UE; and receiving, according to a fourth period, the $PMI_4$ sent by the UE, where the third period is greater than the fourth period; or receiving, according to a second period, the $PMI_2$ sent by the UE;

receiving, according to a third period, the $PMI_3$ sent by the UE; and receiving, according to a fifth period, the $PMI_5$ sent by the UE, where the third period is less than the second period and the fifth period.

In a fifth possible implementation manner, with reference to the third possible implementation manner, the receiving a precoding matrix indicator PMI sent by the UE specifically includes:

receiving, according to a first frequency domain granularity, the $PMI_1$ sent by the UE; and receiving, according to a second frequency domain granularity, the $PMI_2$ sent by the UE, where the first frequency domain granularity is greater than the second frequency domain granularity; or receiving, according to a third frequency domain granularity, the $PMI_3$ sent by the UE; and receiving, according to a fourth frequency domain granularity, the $PMI_4$ sent by the UE, where the third frequency domain granularity is greater than the fourth frequency domain granularity; or receiving, according to a second frequency domain granularity, the $PMI_2$ sent by the UE;

receiving, according to a third frequency domain granularity, the $PMI_3$ sent by the UE; and receiving, according to a fifth frequency domain granularity, the $PMI_5$ sent by the UE, where the third frequency domain granularity is less than the second frequency domain granularity and the fifth frequency domain granularity.

In a sixth possible implementation manner, with reference to the second aspect or the first to fifth possible implementation manners, the block matrix $X_i = [X_{i,1} \ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a seventh possible implementation manner, with reference to the sixth possible implementation manner, each column of the matrix $X_{i,j}=1,2$ is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

In an eighth possible implementation manner, with reference to the second aspect or the first to fifth possible implementation manners, the block matrix $X_i = [X_{i,1} \ X_{i,2}]$, where the matrix $X_{i,j}$ is a Kronecker product of a matrix $A_{i,j}$ and a matrix $B_{i,j}$, and $j=1, 2$.

In a ninth possible implementation manner, with reference to the eighth possible implementation manner, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a tenth possible implementation manner, with reference to the second aspect or the first to ninth possible implementation manners, $W_1$ is an identity matrix.

In an eleventh possible implementation manner, with reference to the second aspect or the first to tenth possible implementation manners, a column vector in the matrix $W_2$ has a structure $y_n = \gamma^{-1}[e_n^T \ e^{j\theta_n}e_n^T]^T$, where e, represents a selection vector; where in the vector, the $n^{th}$ element is 1 and all other elements are 0; $\theta_n$ is a phase shift; and γ is a positive constant.

According to a third aspect, an embodiment of the present invention provides user equipment, where the user equipment includes: a receiving unit, a selection unit, and a sending unit, where the receiving unit is configured to receive a reference signal sent by a base station;

the selection unit is configured to select, based on the reference signal, a precoding matrix from a codebook, where a precoding matrix W included in the codebook is a product of three matrices being $W_1$, Z, and $W_2$, that is, $W=W_1ZW_2$, where both $W_1$ and Z are block diagonal matrices, $W_1$=diag$\{X_1, \ldots, X_{N_B}\}$, Z=diag$\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T \ \beta_{i,k}e^{j\theta_{i,k}} \ e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, and $\beta_{i,k} \geq 0$; and the sending unit is configured to send a precoding matrix indicator PMI to the base station, where the PMI corresponds to the selected precoding matrix, and is used by the base station to obtain the selected precoding matrix W according to the PMI.

In a first possible implementation manner, with reference to the third aspect, the selection unit is specifically configured to select, based on the reference signal, the precoding matrix from a codebook subset, where the codebook subset is a subset predefined, or notified by the base station, or reported by the user equipment.

In a second possible implementation manner, with reference to the first possible implementation manner, the codebook subsets share at least one same matrix subset of the following matrix subsets: subsets of a matrix $W_1$, a matrix $W_1Z$, a matrix $W_2$, a matrix $ZW_2$, and a matrix Z.

In a third possible implementation manner, with reference to the third aspect or the first and second possible implementation manners, the sending unit is specifically configured to send a first precoding matrix indicator $PMI_1$ and a second precoding matrix indicator $PMI_2$ to the base station, where the $PMI_1$ is used to indicate the matrix $W_1Z$, and the $PMI_2$ is used to indicate the matrix $W_2$; or send a third precoding matrix indicator $PMI_3$ and a fourth precoding matrix indicator $PMI_4$ to the base station, where the $PMI_3$ is used to indicate the matrix $W_1$, and the $PMI_4$ is used to indicate the matrix $ZW_2$; or send a second precoding matrix indicator $PMI_2$, a third precoding matrix indicator $PMI_3$, and a fifth precoding matrix indicator $PMI_5$ to the base station, where the $PMI_5$ is used to indicate the matrix Z.

In a fourth possible implementation manner, with reference to the third possible implementation manner, the sending unit is specifically configured to send the $PMI_1$ to the base station according to a first period; and send the $PMI_2$ to the base station according to a second period, where the first period is greater than the second period; or send the $PMI_3$ to the base station according to a third period; and send the $PMI_4$ to the base station according to a fourth period, where the third period is greater than the fourth period; or send the $PMI_2$ to the base station according to a second period;

send the $PMI_3$ to the base station according to a third period; and send the $PMI_5$ to the base station according to a fifth period, where the third period is less than the second period and the fifth period.

In a fifth possible implementation manner, with reference to the third possible implementation manner, the sending unit is specifically configured to send the $PMI_1$ to the base station according to a first frequency domain granularity; and send the $PMI_2$ to the base station according to a second frequency domain granularity, where the first frequency domain granularity is greater than the second frequency domain granularity; or send the $PMI_3$ to the base station according to a third frequency domain granularity; and send the $PMI_4$ to the base station according to a fourth frequency domain granularity, where the third frequency domain granularity is greater than the fourth frequency domain granularity; or send the $PMI_2$ to the base station according to a second frequency domain granularity;

send the $PMI_3$ to the base station according to a third frequency domain granularity; and send the $PMI_5$ to the base station according to a fifth frequency domain granularity, where the third frequency domain granularity is less than the second frequency domain granularity and the fifth frequency domain granularity.

In a sixth possible implementation manner, with reference to the third aspect or the first to fifth possible implementation manners, the block matrix $X_i=[X_{i,1} \ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a seventh possible implementation manner, with reference to the sixth possible implementation manner, each column of the matrix $X_{i,j}=1,2$ is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

In an eighth possible implementation manner, with reference to the third aspect or the first to fifth possible implementation manners, the block matrix $X_i=[X_{i,1}\ X_{i,2}]$, where the matrix $X_{i,j}$ is a Kronecker product of two matrices being $A_{i,j}$ and $B_{i,j}$, and j=1, 2.

In a ninth possible implementation manner, with reference to the eighth possible implementation manner, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a tenth possible implementation manner, with reference to the third aspect or the first to ninth possible implementation manners, $W_1$ is an identity matrix.

In an eleventh possible implementation manner, with reference to the third aspect or the first to tenth possible implementation manners, a column vector in the matrix $W_2$ has a structure $y_n=\gamma^{-1}[e_n^T\ e^{j\theta_n}e_n^T]^T$, where $e_n$ represents a selection vector; where in the vector, the $n^{th}$ element is 1 and all other elements are 0; $\theta_n$ is a phase shift; and γ is a positive constant.

According to a fourth aspect, an embodiment of the present invention provides a base station, where the base station includes: a sending unit, a receiving unit, and a determining unit, where the sending unit is configured to send a reference signal to user equipment UE;

the receiving unit is configured to receive a precoding matrix indicator PMI sent by the UE; and the determining unit is configured to determine a precoding matrix W in a codebook according to the PMI, where the precoding matrix W is a product of three matrices being $W_1$, Z, and $W_2$, that is, $W=W_1ZW_2$, where both $W_1$ and Z are block diagonal matrices, $W_1$=diag$\{X_1, \ldots, X_{N_B}\}$, Z=diag$\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}} [\alpha_{i,k} e_{i,k}^T \quad \beta_{i,k} e^{j\theta_{i,k}} e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, and $\beta_{i,k} \geq 0$.

In a first possible implementation manner, with reference to the fourth aspect, the determining unit is specifically configured to:

determine the precoding matrix in a codebook subset according to the PMI, where the codebook subset is a subset predefined, or reported by the user equipment, or notified by the base station.

In a second possible implementation manner, with reference to the first possible implementation manner, the codebook subsets share at least one same matrix subset of the following matrix subsets: subsets of a matrix $W_1$, a matrix $W_1Z$, matrix $W_2$, a matrix $ZW_2$, and a matrix Z.

In a third possible implementation manner, with reference to the fourth aspect or the first and second possible implementation manners, the receiving unit is specifically configured to:

receive a first precoding matrix indicator $PMI_1$ and a second precoding matrix indicator $PMI_2$ that are sent by the UE, where the $PMI_1$ is used to indicate the matrix $W_1Z$, and the $PMI_2$ is used to indicate the matrix $W_2$;

or receive a third precoding matrix indicator $PMI_3$ and a fourth precoding matrix indicator $PMI_4$ that are sent by the UE, where the $PMI_3$ is used to indicate the matrix $W_1$, and the $PMI_4$ is used to indicate the matrix $ZW_2$;

or receive a second precoding matrix indicator $PMI_2$, a third precoding matrix indicator $PMI_3$, and a fifth precoding matrix indicator $PMI_5$ that are sent by the UE, where the $PMI_5$ is used to indicate the matrix Z.

In a fourth possible implementation manner, with reference to the third possible implementation manner, the receiving unit is specifically configured to:

receive, according to a first period, the $PMI_1$ sent by the UE; and receive, according to a second period, the $PMI_2$ sent by the UE, where the first period is greater than the second period; or receive, according to a third period, the $PMI_3$ sent by the UE; and receive, according to a fourth period, the $PMI_4$ sent by the UE, where the third period is greater than the fourth period; or receive, according to a second period, the $PMI_2$ sent by the UE;

receive, according to a third period, the $PMI_3$ sent by the UE; and receive, according to a fifth period, the $PMI_5$ sent by the UE, where the third period is less than the second period and the fifth period.

In a fifth possible implementation manner, with reference to the third possible implementation manner, the receiving unit is specifically configured to:

receive, according to a first frequency domain granularity, the $PMI_1$ sent by the UE; and receive, according to a second frequency domain granularity, the $PMI_2$ sent by the UE, where the first frequency domain granularity is greater than the second frequency domain granularity; or receive, according to a third frequency domain granularity, the $PMI_3$ sent by the UE; and receive, according to a fourth frequency domain granularity, the $PMI_4$ sent by the UE, where the third frequency domain granularity is greater than the fourth frequency domain granularity; or receive, according to a second frequency domain granularity, the $PMI_2$ sent by the UE;

receive, according to a third frequency domain granularity, the $PMI_3$ sent by the UE; and receive, according to a fifth frequency domain granularity, the $PMI_5$ sent by the UE, where the third frequency domain granularity is less than the second frequency domain granularity and the fifth frequency domain granularity.

In a sixth possible implementation manner, with reference to the fourth aspect or the first to fifth possible implementation manners, the block matrix $X_i=[X_{i,1}\ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a seventh possible implementation manner, with reference to the sixth possible implementation manner, each column of the matrix $X_{i,j}$ is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

In an eighth possible implementation manner, with reference to the fourth aspect or the first to fifth possible implementation manners, the block matrix $X_i = [X_{i,1} \ X_{i,2}]$, where the matrix $X_{i,j}$ is a Kronecker product of two matrices being $A_{i,j}$ and $B_{i,j}$, and j=1, 2.

In a ninth possible implementation manner, with reference to the eighth possible implementation manner, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

In a tenth possible implementation manner, with reference to the fourth aspect or the first to ninth possible implementation manners, $W_1$ is an identity matrix.

In an eleventh possible implementation manner, with reference to the fourth aspect or the first to tenth possible implementation manners, a column vector in the matrix $W_2$ has a structure $y_n = \gamma^{-1}[e_n^T \ e^{j\theta_n} e_n^T]^T$, where $e_n$ represents a selection vector; where in the vector, the $n^{th}$ element is 1 and all other elements are 0; $\theta_n$ is a phase shift; and $\gamma$ is a positive constant.

The embodiments of the present invention provide a method for reporting channel state information, user equipment, and a base station. The method includes: after receiving reference information sent by a base station, selecting, by user equipment based on the reference information, a precoding matrix from a codebook, where a precoding matrix W included in the codebook is a product of three matrices being $W_1$, Z, and $W_2$, where both $W_1$ and Z are block diagonal matrices, $W_1 = \text{diag}\{X_1, \ldots, X_{N_B}\}$, $Z = \text{diag}\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}} [\alpha_{i,k} e_{i,k}^T \ \beta_{i,k} e^{j\theta_{i,k}} e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, and $\beta_{i,k} \geq 0$; and sending a precoding matrix indicator PMI to the base station according to the selected precoding matrix W, where the PMI is used by the base station to obtain the selected precoding matrix W according to the PMI. In the precoding matrix indicated in the channel state information reported by the user equipment, a channel characteristic of a double-transmission condition in a micro cell network environment and freedom in a perpendicular direction of an antenna are considered, which can improve communication performance of the micro cell network environment and the freedom in the perpendicular direction of the antenna.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some embodiments of the present invention, and a person of ordinary skill in the art may still derive other drawings from these accompanying drawings without creative efforts.

DESCRIPTION OF EMBODIMENTS

Various technologies described in this specification are applicable to a Long Term Evolution (LTE, Long Term Evolution) system. The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (for example, RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communications service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be referred to as a system, a subscriber unit (Subscriber Unit), a subscriber station (Subscriber Station), a mobile station (Mobile Station), a mobile station (Mobile), a remote station (Remote Station), an access point (Access Point), a remote terminal (Remote Terminal), an access terminal (Access Terminal), a user terminal (User terminal), a user agent (User agent), a user device (User Device), user equipment (User Equipment), or a relay (Relay), which is not limited in the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/"

in this specification generally indicates an "or" relationship between the associated objects.

Embodiment 1

Figure 1:
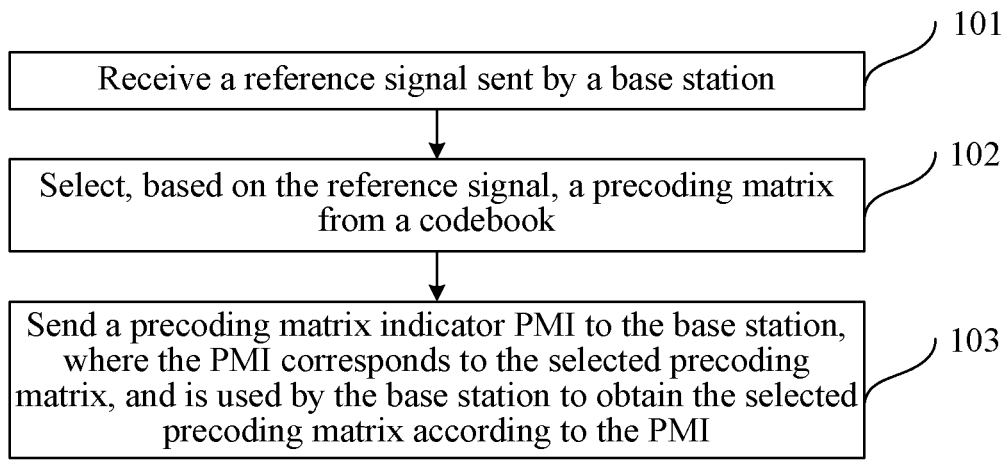
FIG. 1 is a schematic flowchart of a method for reporting channel state information according to an embodiment of the present invention.

This embodiment of the present invention provides a method for reporting channel state information. The method is executed by user equipment UE, and as shown in FIG. 1, the method includes:

Step 101: Receive a reference signal sent by a base station.

Specifically, the reference signal sent by the base station may include a channel state information reference signal (channel state information Reference Signal, CSI RS), or a demodulation reference signal (demodulation RS, DM RS), or a cell-specific reference signal (cell-specific RS, CRS). The user equipment UE may obtain a resource configuration of the reference signal by receiving a notification of the eNB such as RRC (Radio Resource Control, Radio Resource Control) signaling or DCI (Downlink Control Information, downlink control information), or on the basis of a cell identity ID; and obtain the reference signal in a corresponding resource or subframe.

Step 102: Select, based on the reference signal, a precoding matrix from a codebook, where a precoding matrix W included in the codebook is a product of three matrices being $W_1$, $Z$, and $W_2$, that is, $$W = W_1 Z W_2 \qquad (1)$$

where both $W_1$ and Z are block diagonal matrices, that is:

$$W_1 = \mathrm{diag}\{X_1, \ldots, X_{N_B}\} \qquad (2)$$

$$Z = \mathrm{diag}\{Z_1, \ldots, Z_{N_B}\} \qquad (3)$$

and meet the following condition:

$$W_1 Z = \mathrm{diag}\{X_1 Z_1, \ldots, X_{N_B} Z_{N_B}\} \qquad (4)$$

each of $W_1$ and Z includes at least one block matrix, that is, a block matrix quantity $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}} [\alpha_{i,k} e_{i,k}^T \quad \beta_{i,k} e^{j\theta_{i,k}} e_{i,k}^T]^T \qquad (5)$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$, that is, $2n_i$ is a column quantity of the block matrix $X_i$; $\theta_{i,k}$ is a phase shift, $\alpha_{i,k} \geq 0$, $\beta_{i,k} \geq 0$; and $X_i$ corresponds to $Z_i$.

In the structure (5), for the precoding matrix, two column vectors (or referred to as beams) can be separately selected from each block matrix $X_i$ by using two $e_{i,k}$ in $z_{i,k}$; and phase alignment and weighting are performed on the two column vectors (or beams) by using $\alpha_{i,k}$ and $\beta_{i,k} e^{j\theta_{i,k}}$, where the two column vectors selected from $X_i$ may separately point to two major multipath transmission directions.

In analysis from the perspective of physical meaning, the block diagonal matrix $W_1$ is a beam group formed by the block matrices $X_i$ that include different beams (or column vectors), and correspondingly, each column of each block matrix $Z_i$ included in the matrix Z is used to combine (including phase alignment and weighting) two beams in the block matrix $X_i$, where directions of the two beams may separately point to two major multipath transmission directions. Therefore, for each column of an obtained matrix $X_i Z_i$, interference between two major multipath transmission directions can be converted into a wanted signal by using the foregoing structure, thereby significantly improving transmit power corresponding to each column of $X_i Z_i$.

The parameters $\alpha_{i,k}$ and $\beta_{i,k}$ may be equal, and in this case, equal-power combining gains of two beams are obtained. One of the parameters $\alpha_{i,k}$ and $\mu_{i,k}$ may be 0, and in this case, selective combining gains of two beams are obtained. The parameters $\alpha_{i,k}$ and $\beta_{i,k}$ may also be other quantized values, for example, a value of $\beta_{i,k} e^{j\theta_{i,k}}$ may be selected from a constellation diagram of modulation such as 16QAM or 64QAM, and in this case, maximum ratio combining gains of two beams are obtained.

The matrix $W_2$ is used to select one or more column vectors in the matrix $W_1 Z$ and perform weighting combination to form the matrix W. By using the matrix $W_2$, the precoding matrix W can further adapt to a sub-band or a short-term characteristic of a channel, and one-layer or multi-layer transmission is formed, thereby improving a transmission rate.

Specifically, the block matrix $X_i$ in the matrix $W_1$ may have the following structure:

$$X_i = [X_{i,1} X_{i,2}], 1 \leq i \leq N_B \qquad (6)$$

where, each column of the matrix $X_{i,j}$ may be selected from columns of a Householder (Householder) matrix H, where the matrix H is:

$$H \in \{I - 2u_n u_n^H / u_n^H u_n\} \qquad (7)$$

For example, the vector $u_n$ may be a vector used in an LTE R8 4-antenna codebook, and is shown in the following table:

$u_0 = [1\ -1\ -1\ -1]^T$
$u_1 = [1\ -j\ 1\ j]^T$
$u_2 = [1\ 1\ -1\ 1]^T$
$u_3 = [1\ j\ 1\ -j]^T$
$u_4 = [1\ (-1-j)/\sqrt{2}\ -j\ (1-j)/\sqrt{2}]^T$
$u_5 = [1\ (1-j)/\sqrt{2}\ j\ (-1-j)/\sqrt{2}]^T$
$u_6 = [1\ (1+j)/\sqrt{2}\ -j\ (-1+j)/\sqrt{2}]^T$
$u_7 = [1\ (-1+j)/\sqrt{2}\ j\ (1+j)/\sqrt{2}]^T$
$u_8 = [1\ -1\ 1\ 1]^T$
$u_9 = [1\ -j\ -1\ -j]^T$
$u_{10} = [1\ 1\ 1\ -1]^T$
$u_{11} = [1\ j\ -1\ j]^T$
$u_{12} = [1\ -1\ -1\ 1]^T$
$u_{13} = [1\ -1\ 1\ -1]^T$
$u_{14} = [1\ 1\ -1\ -1]^T$
$u_{15} = [1\ 1\ 1\ 1]^T$ Each column in the two matrices $X_{i,j}$, j=1, 2 may be from a column set of a same Householder matrix H, or may be separately from column sets of different Householder matrices H. In the former case, columns in $X_{i,j}$, j=1, 2 are orthogonal to each other, and it is suitable for multipath transmission directions that are orthogonal to each other. In the latter case, columns in $X_{i,j}$, j=1, 2 may be close to each other, and it is suitable for multipath transmission directions that are not orthogonal to each other.

Each column of the matrix $X_{i,j}$ in formula (6) may also be selected from columns of a discrete Fourier transform (Discrete Fourier Transform, DFT) matrix F, where the matrix F is:

$$F \in \left\{ F_g = \left[ e^{j\frac{2\pi m}{N}(n+g/G)} \right]_{N \times N}, g = 0, 1, \ldots G-1 \right\} \qquad (8)$$

where $$\left[e^{j\frac{2\pi m}{N}\left(n+\frac{g}{G}\right)}\right]_{N\times N}$$

represents that an element in the (m+1)$^{th}$ row and the (n+1)$^{th}$ column is an N×N matrix of $$e^{j\frac{2\pi m}{N}(n+g/G)},$$

where m,n=0, 1 . . . , N–1; j represents a unit pure imaginary number, that is, $j=\sqrt{-1}$; G is a positive integer; and g/G is a phase shift parameter. Multiple different DFT matrices may be obtained by selecting G and g. Columns of the two matrices $X_{i,j}$, j=1, 2 may be from a same DFT matrix F, or may be from different DFT matrices F. In the former case, columns in $X_{i,j}$, j=1, 2 are orthogonal to each other, and it is suitable for multipath transmission directions that are orthogonal to each other. In the latter case, columns in $X_{i,j}$, j=1, 2 may be close to each other, and it is suitable for multipath transmission directions that are not orthogonal to each other.

Each column of the matrix $X_{i,j}$ in formula (6) may also be selected from columns of the following Hadamard (Hadamard) matrix or rotated Hadamard matrix:

$$\text{diag}\{1, e^{jm\pi/N}, e^{jm\pi/N}, e^{j3m/N}\}H_n \qquad (9)$$

where N is a positive integer, m=0, . . . , N–1, $H_n$ is an n-order Hadamard matrix, and j represents a unit pure imaginary number, that is, $j=\sqrt{-1}$. When m=0, a matrix shown in (10) is an n-order Hadamard matrix $H_n$. For example, $H_4$ is:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad (10)$$

Columns in the two matrices $X_{i,j}$, j=1, 2 may be from a same Hadamard matrix or rotated Hadamard matrix, or may be from different Hadamard matrices or rotated Hadamard matrices. In the former case, columns in $X_{i,j}$, j=1, 2 are orthogonal to each other, and it is suitable for multipath transmission directions that are orthogonal to each other. In the latter case, columns in $X_{i,j}$, j=1, 2 may be close to each other, and it is suitable for multipath transmission directions that are not orthogonal to each other.

Each column of the matrix $X_{i,j}$ in formula (6) may also be selected from columns of a precoding matrix in an LTE R8 system 2-antenna or 4-antenna codebook or in an LTE R10 system 8-antenna codebook. Columns of the two matrices $X_{i,j}$, j=1, 2 may be from a same precoding matrix, or may be from different precoding matrices. In the former case, columns in $X_{i,j}$, j=1, 2 are orthogonal to each other, and it is suitable for multipath transmission directions that are orthogonal to each other. In the latter case, columns in $X_{i,j}$, j=1, 2 may be close to each other, and it is suitable for multipath transmission directions that are not orthogonal to each other.

The matrix $X_{i,j}$ in formula (6) may also have the following structure:

$$X_{i,j}=A_{i,j}\otimes B_{i,j}, 1\leq i\leq N_B, j=1,2 \qquad (11)$$

That is, the block matrix $X_{i,j}$ is a Kronecker (kronecker) product of a matrix $A_{i,j}$ and a matrix $B_{i,j}$, where j=1, 2.

Further, each column of the matrix $A_{i,j}$ or the matrix $B_{i,j}$ in formula (11) may be a column vector of the Householder matrix shown in (7), or the DFT matrix shown in (8), or the Hadamard matrix or the rotated Hadamard matrix shown in (9) or (10), or the precoding matrix in the LTE R8 system 2-antenna or 4-antenna codebook or in the LTE R10 system 8-antenna codebook. In addition, other forms may also be used for the matrix $A_{i,j}$ or the matrix $B_{i,j}$, which are not described in detail herein.

For the matrix $A_{i,j}$ or the matrix $B_{i,j}$ in the structure (11), beamforming and precoding may be separately performed in a horizontal direction and a perpendicular direction of an AAS base station. Therefore, the precoding matrix W can adapt to an antenna configuration of the AAS base station, thereby fully using freedom in horizontal and perpendicular directions of an antenna of the AAS base station.

Columns in the two matrices being $A_{i,j}$ and $B_{i,j}$, j=1, 2 may be from a same precoding matrix in formula (7) to formula (10) or in the LTE R8 system 2-antenna or 4-antenna codebook or in the LTE R10 system 8-antenna codebook, or may be from different precoding matrices. In the former case, columns in $X_{i,j}$, j=1, 2 are orthogonal to each other, and it is suitable for multipath transmission directions that are orthogonal to each other. In the latter case, columns in $X_{i,j}$, j=1, 2 may be close to each other, and it is suitable for multipath transmission directions that are not orthogonal to each other.

Further, the block matrices $X_i$ in formula (6) may be equal to each other, where $1\leq i\leq N_B$; in this way, relevance between channels can be fully used, and feedback overheads can be further reduced.

Specifically, the block matrix $X_i$ in the matrix $W_1$ may also be an identity matrix, that is, $W_1$ is an identity matrix; and in this case, $W_1Z=Z$. In this case, the structure shown in (5) helps select two antenna ports by directly using two $e_{i,k}$ in $z_{i,k}$, and helps perform phase alignment and weighting on the two antenna ports by using $\alpha_{i,k}e^{j\theta_{i,k}}$, where the two selected antenna ports may separately align with two major multipath transmission directions. An actually deployed antenna port may correspond to a virtual antenna, where each virtual antenna is obtained by performing weighting combination on multiple physical antennas, and virtual antennas may have different beam directions; therefore, in the foregoing precoding structure, different beam directions of the antenna ports can be fully used, and interference between two major multipath transmission directions can be directly converted into a wanted signal, thereby significantly improving a system transmission rate.

Specifically, the phase $\theta_{i,k}$ in the structure (5) may be selected from the following values:

$$\theta_{i,k} \in \left\{0, \frac{2\pi}{N}, \ldots, \frac{(N-1)2\pi}{N}\right\} \qquad (12)$$

where N is a positive integer, for example, N is 2 to the power of n, where n is a positive integer.

Further, the foregoing block matrices $Z_i$ may be equal to each other, where $1\leq i\leq N_B$; in this way, relevance between channels can be fully used, and feedback overheads can be further reduced.

The matrix $W_2$ is used to select or perform weighting combination on a column vector in the matrix $W_1Z$ to form the matrix W.

Specifically, a column vector in the matrix $W_2$ has a structure: $y_n = \gamma^{-1}[e_n^T \ e^{j\Theta_n}e_n^T]^T$, where $e_n$ represents a selection vector, where in the vector, the $n^{th}$ element is 1 and all other elements are 0; $\theta_n$ is a phase shift; and $\beta$ is a positive constant.

An example in which a block matrix quantity $N_B=2$, and two block matrices $X_1Z_1$ and $X_2Z_2$ in $W_1Z$ separately have 4 columns is used, and the matrix $W_2$ may be:

$$W_2 \in \left\{ \frac{1}{\sqrt{2}}\begin{bmatrix}Y\\Y\end{bmatrix}, \frac{1}{\sqrt{2}}\begin{bmatrix}Y\\jY\end{bmatrix}, \frac{1}{\sqrt{2}}\begin{bmatrix}Y\\-Y\end{bmatrix}, \frac{1}{\sqrt{2}}\begin{bmatrix}Y\\-jY\end{bmatrix} \right\} \quad (13)$$

$$Y \in \{\tilde{e}_1, \tilde{e}_2, \tilde{e}_3, \tilde{e}_4\} \quad (14)$$

or $$W_2 \in \left\{ \frac{1}{\sqrt{2}}\begin{bmatrix}Y_1 & Y_2\\Y_1 & -Y_2\end{bmatrix}, \frac{1}{\sqrt{2}}\begin{bmatrix}Y_1 & Y_2\\jY_1 & -jY_2\end{bmatrix} \right\} \quad (15)$$

$$(Y_1, Y_2) \in \{(\tilde{e}_1, \tilde{e}_1), (\tilde{e}_2, \tilde{e}_2), (\tilde{e}_3, \tilde{e}_3), \quad (16)$$
$$(\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$$

where $\tilde{e}_n$, n=1, 2, 3, 4 represents a 4×1 selection vector, where in the vector, the $n^{th}$ element is 1 and all other elements are 0.

An example in which a block matrix quantity $N_B=2$, and two block matrices $X_1Z_1$ and $X_2Z_2$ in $W_1Z$ separately have 8 columns is used, and the matrix $W_2$ may be:

$$W_2 \in \left\{ \frac{1}{\sqrt{2}}\begin{bmatrix}Y\\Y\end{bmatrix}, \frac{1}{\sqrt{2}}\begin{bmatrix}Y\\jY\end{bmatrix}, \frac{1}{\sqrt{2}}\begin{bmatrix}Y\\-Y\end{bmatrix}, \frac{1}{\sqrt{2}}\begin{bmatrix}Y\\-jY\end{bmatrix} \right\} \quad (17)$$

$$Y \in \{e_1, e_2, e_3, e_4, e_5, e_6, e_7, e_8\} \quad (18)$$

or $$W_2 \in \left\{ \frac{1}{\sqrt{2}}\begin{bmatrix}Y_1 & Y_2\\Y_1 & -Y_2\end{bmatrix}, \frac{1}{\sqrt{2}}\begin{bmatrix}Y_1 & Y_2\\jY_1 & -jY_2\end{bmatrix} \right\} \quad (19)$$

$$(Y_1, Y_2) \in \{(e_1, e_1), (e_2, e_2), (e_3, e_3), \quad (20)$$
$$(e_4, e_4), (e_1, e_2), (e_2, e_3), (e_1, e_4), (e_2, e_4)\}$$

where $e_n$, n=1, 2, . . . , 8 represents an 8×1 selection vector, where in the vector, the $n^{th}$ element is 1 and all other elements are 0.

Specifically, the selecting, based on the reference signal, a precoding matrix from a codebook may include:

obtaining, by the user equipment UE based on the reference signal, channel estimation, and selecting the precoding matrix from the codebook according to the channel estimation and based on a predefined rule such as a rule of maximizing a channel capacity or a throughput, where selection, based on a predefined rule, of a precoding matrix is the prior art, and is not described in detail herein.

Step 103: Send a precoding matrix indicator PMI to the base station according to the selected precoding matrix W, where the PMI is used by the base station to obtain the selected precoding matrix W according to the PMI.

Specifically, the precoding matrix W is included in a precoding matrix set or a codebook, and the PMI is used to indicate the precoding matrix W selected from the precoding matrix set or the codebook.

Specifically, the sending a precoding matrix indicator PMI to the base station includes: sending the precoding matrix indicator PMI to the base station, where the PMI may only include a specific value, and in this case, the PMI directly indicates the precoding matrix W. For example, there are a total of 16 different precoding matrices, and PMI=0, . . . , 15 may be used to respectively indicate precoding matrices W marked as 0, 1, . . . , 15.

Specifically, the sending a precoding matrix indicator PMI to the base station may also include: sending precoding matrix indicators $PMI_1$ and $PMI_2$ to the base station, where the $PMI_1$ and the $PMI_2$ are respectively used to indicate the matrix $W_1Z$ and the matrix $W_2$ in formula (1), and in this case, the matrix $W_1Z$ and the matrix $W_2$ are respectively indicated by the $PMI_1$ and the $PMI_2$ in the codebook;

or the sending a precoding matrix indicator PMI to the base station may also include: sending a third precoding matrix indicator $PMI_3$ and a fourth precoding matrix indicator $PMI_4$ to the base station, where the $PMI_3$ is used to indicate the matrix $W_1$, and the $PMI_4$ is used to indicate the matrix $ZW_2$;

or sending a second precoding matrix indicator $PMI_2$, a third precoding matrix indicator $PMI_3$, and a fifth precoding matrix indicator $PMI_5$ to the base station, where the $PMI_5$ is used to indicate the matrix Z.

Further, the precoding matrix indicators $PMI_1$ and $PMI_2$, or $PMI_3$ and $PMI_4$, or $PMI_2$, $PMI_3$, and $PMI_5$ have different time domains or frequency domain granularities. Specifically, the sending a precoding matrix indicator PMI to the base station specifically includes:

sending the $PMI_1$ to the base station according to a first period; and sending the $PMI_2$ to the base station according to a second period, where the first period is greater than the second period; or sending the $PMI_3$ to the base station according to a third period; and sending the $PMI_4$ to the base station according to a fourth period, where the third period is greater than the fourth period; or sending the $PMI_2$ to the base station according to a second period;

sending the $PMI_3$ to the base station according to a third period; and sending the $PMI_5$ to the base station according to a fifth period, where the third period is less than the second period and the fifth period;

or, sending the $PMI_1$ to the base station according to a first frequency domain granularity; and sending the $PMI_2$ to the base station according to a second frequency domain granularity, where the first frequency domain granularity is greater than the second frequency domain granularity, for example, sending a wideband $PMI_1$ and a sub-band $PMI_2$ to the base station; or sending the $PMI_3$ to the base station according to a third frequency domain granularity; and sending the $PMI_4$ to the base station according to a fourth frequency domain granularity, where the third frequency domain granularity is greater than the fourth frequency domain granularity, for example, sending a wideband $PMI_3$ and a sub-band $PMI_4$ to the base station; or sending the $PMI_2$ to the base station according to a second frequency domain granularity;

sending the $PMI_3$ to the base station according to a third frequency domain granularity; and sending the PMI₅ to the base station according to a fifth frequency domain granularity, where the third frequency domain granularity is less than the second frequency domain granularity and the fifth frequency domain granularity, for example, sending a wideband PMI₂, a wideband PMI₅, and a sub-band PMI₃ to the base station.

It should be noted that, the sizes of the foregoing wideband and sub-band may vary with the size of a system bandwidth. For example, in a 10 MHz LTE system that includes 50 physical resource blocks (Resource Block, RB), the wideband may include 50 RBs, and the size of the sub-band may be 6 consecutive RBs; and in a 5 MHz LTE system, the wideband may include 25 RBs, and the size of the sub-band may be 3 consecutive RBs.

For the foregoing different time domains, or frequency domain granularities, or reporting periods, feedback overheads can be further reduced by using time or frequency domain relevance between channels.

Specifically, the sending a precoding matrix indicator PMI to the base station may also include: sending a precoding matrix indicator PMI1$_i$, where 1≤i≤N$_B$, and the PMI₂ to the base station; PMI1$_i$, where 1≤i≤N$_B$, and the PMI₂ are respectively used to indicate the matrix X$_i$Z$_i$, where 1≤i≤N$_B$, and the matrix W₂;

or sending a precoding matrix indicator PMI3$_i$, where 1≤i≤N$_B$, and the PMI₄ to the base station; PMI3$_i$, where 1≤i≤N$_B$, is used to indicate X$_i$, and the PMI₄ is used to indicate the matrix ZW₂;

or sending a precoding matrix indicator PMI3$_i$, where 1≤i≤N$_B$, the PMI₂, and the PMI₅ to the base station, where the PMI₅ is used to indicate the matrix Z.

Specifically, the sending a precoding matrix indicator PMI to the base station may also include: sending a precoding matrix indicator PMI5$_i$, where 1≤i≤N$_B$/2, and the PMI₂ to the base station; PMI5$_i$, where 1≤i≤N$_B$/2, and the PMI₂ are respectively used to indicate the matrix X$_{2i-1}$Z$_{2i-1}$=X$_{2i}$Z$_{2i}$, where 1≤i≤N$_B$/2, and a matrix W₂; and in this case, X$_{2i-1}$Z$_{2i-1}$=X$_{2i}$Z$_{2i}$ and the two matrices appear in pairs.

Specifically, the sending a precoding matrix indicator PMI to the base station may be: sending, by the UE, the precoding matrix indicator PMI to the base station through a physical uplink control channel (Physical Uplink Control Channel, PUCCH) or a physical uplink shared channel (Physical Uplink Shared Channel, PUSCH).

Further, the sending a precoding matrix indicator PMI to the base station may be: separately sending, by the UE to the base station by using different subframes or in different periods, the PMI₁ and the PMI₂, or the PMI₃ and the PMI₄, or the PMI₂, the PMI₃, and the PMI₅, or the PMI1$_i$, where 1≤i≤N$_B$, and the PMI₂, or the PMI3$_{,i}$ and the PMI₄, or the PMI3$_i$, where 1≤i≤N$_B$, the PMI₂, and the PMI₅, or the PMI5$_i$, where 1≤i≤N$_B$/2, and the PMI₂.

Further, the sending a precoding matrix indicator PMI to the base station may also be: separately sending, by the UE to the base station according to different sub-bands or sub-band widths in a frequency domain, the PMI₁ and the PMI₂, or the PMI₃ and the PMI₄, or the PMI₂, the PMI₃, and the PMI₅, or the PMI1$_i$, where 1≤i≤N$_B$, and the PMI₂, or the PMI3$_{,i}$ and the PMI₄, or the PMI3$_i$, where 1≤i≤N$_B$, the PMI₂, and the PMI₅, or the PMI5$_i$, where 1≤i≤N$_B$/2, and the PMI₂.

In addition, multiple block matrices X$_i$ may separately correspond to antenna groups of different polarizations or different locations; therefore, the precoding matrix can match multiple antenna deployments or configurations. The foregoing codebook structure can significantly improve performance of MIMO, especially MU-MIMO.

In addition, one or more PMI₅ are fed back based on a subset, to indicate the precoding matrix; therefore, time/frequency domain/space relevance between channels is fully used, thereby significantly reducing feedback overheads.

Figure 2:
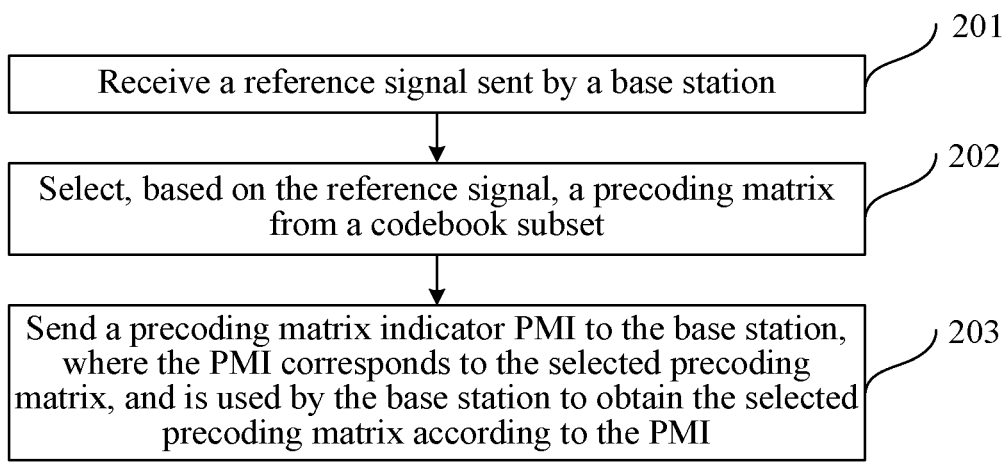
FIG. 2 is a schematic flowchart of another method for reporting channel state information according to an embodiment of the present invention.

Further, as shown in FIG. 2, after the step 201 of receiving a reference signal sent by a base station, the selecting, based on the reference signal, a precoding matrix from a codebook is specifically:

202: Select, based on the reference signal, the precoding matrix from a codebook subset.

The codebook subset may be a predefined codebook subset; or may be a codebook subset as follows: the codebook subset is reported by the UE to the base station eNB, notified by the base station eNB based on a report of the UE, and then told by the base station to the UE; or may be a codebook subset that is determined and reported by the UE, for example, a recently reported codebook subset.

Further, the codebook subset and another codebook subset share at least one same matrix subset of the following matrix subsets: subsets of a matrix W₁, a matrix W₁Z, a matrix W₂, a matrix ZW₂, and a matrix Z.

As described above, the precoding matrix is selected based on the codebook subset, which can further reduce feedback overheads and implementation complexity.

Further, the codebook subsets share a same subset of the matrix W₁, or the matrix W₁Z, or the matrix W₂, or the matrix ZW₂, or the matrix Z, and therefore, the codebook subsets overlap with each other, which can overcome an edge effect of quantization of channel state information.

Further, in the precoding matrix, the block matrices X$_i$ of the block diagonal matrix W₁ may be unequal, or may be equal. If the block diagonal matrix W₁ has multiple equal block matrices, for example, equal block matrices may appear in pairs, feedback overheads can be further reduced.

It should be noted that, the three matrices W₁, Z, and W₂ included in the precoding matrix W that is selected, based on the reference signal, from the codebook may further be multiplied by a scale factor, so as to implement power normalization or power balancing. In addition, apart from the precoding matrix having the foregoing structure, the codebook may further include other precoding matrices, so as to meet requirements of other scenarios, which is not limited herein.

This embodiment of the present invention provides the method for reporting channel state information. The method includes: after receiving reference information sent by a base station, selecting, by user equipment based on the reference information, a precoding matrix from a codebook, where a precoding matrix W included in the codebook is a product of three matrices being W₁, Z, and W₂ where both W₁ and Z are block diagonal matrices, W₁=diag{X₁, ..., X$_{N_B}$}, Z=diag{Z₁, ..., Z$_{N_B}$}, each of W₁ and Z includes at least one block matrix, that is, N$_B$≥1, and each column of each block matrix Z$_i$ in the matrix Z has the following structure:

$$z_{i,k} = (\alpha_{i,k}^2 + \beta_{i,k}^2)^{-\frac{1}{2}} [\alpha_{i,k} e_{i,k}^T \ \beta_{i,k} e^{j\theta_{i,k}} e_{i,k}^T]^T$$

where [ ]$^T$ represents matrix transposition; e$_{i,k}$ represents an n$_i$×1 selection vector, where in the vector, the k$^{th}$ element is 1 and all other elements are 0, and n$_i$ is a half of a column quantity of a block matrix X$_i$; θ$_{i,k}$ is a phase shift, α$_{i,k}$≥0, and β$_{i,k}$≥0; and sending a precoding matrix indicator PMI to the base station according to the selected precoding matrix W, where the PMI is used by the base station to obtain the selected precoding matrix W according to the PMI. In the precoding matrix indicated in the channel state information reported by the user equipment, a channel characteristic of a double-transmission condition in a micro cell network environment and freedom in a perpendicular direction of an antenna are considered, that is, each column of each block matrix $Z_i$ in the matrix Z has a structure: $z_{i,k} = (\alpha_{i,k}^2 + \beta_{i,k}^2)^{-1/2}[\alpha_{i,k}e_{i,k}^T \ \beta_{i,k}e^{j\theta_{i,k}}e_{i,k}^T]^T$. For the precoding matrix, two column vectors (or referred to as beams) can be separately selected from each block matrix $X_i$ by using the structure of the matrix Z; and phase alignment and weighting are performed on the two column vectors (or beams), where the two column vectors selected from $X_i$ may separately point to two major multipath transmission directions. Therefore, by using the foregoing structure, for each column of an obtained matrix $X_iZ_i$, interference between two major multipath transmission directions can be converted into a wanted signal, and combining gains are obtained, thereby improving system transmission reliability and a system transmission throughput.

Embodiment 2

Figure 3:
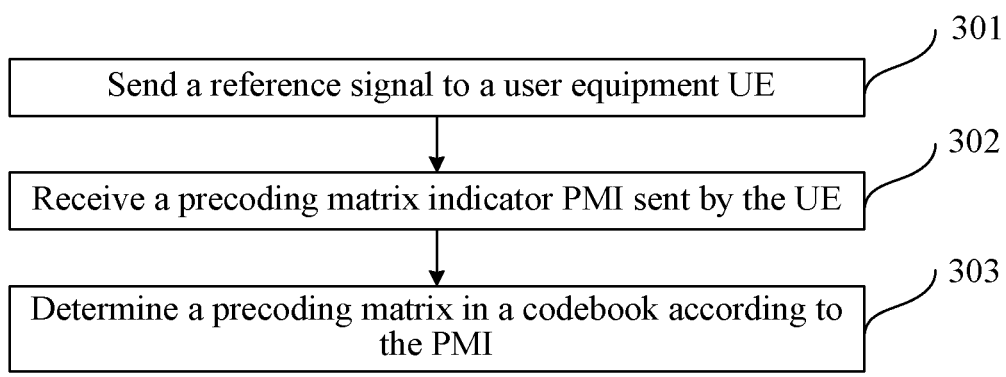
FIG. 3 is a schematic flowchart of still another method for reporting channel state information according to an embodiment of the present invention.

This embodiment of the present invention further provides a method for reporting channel state information. The method is executed by a base station, and as shown in FIG. 3, the method includes:

301: Send a reference signal to user equipment UE.

302: Receive a precoding matrix indicator PMI sent by the UE.

303: Determine a precoding matrix W in a codebook according to the PMI, where the precoding matrix W is a product of three matrices being $W_1$, Z, and $W_2$, that is, $W=W_1ZW_2$, where both $W_1$ and Z are block diagonal matrices, $W_1$=diag$\{X_1, \ldots, X_{N_B}\}$, Z=diag$\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T \ \beta_{i,k}e^{j\theta_{i,k}}e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, $\beta_{i,k} \geq 0$; and $X_i$ corresponds to $Z_i$.

It should be noted that, apart from the precoding matrix having the foregoing structure, the codebook may further include other precoding matrices, so as to meet requirements of other scenarios, which is not limited herein.

In this embodiment of the present invention, user equipment determines and sends a precoding matrix indicator PMI, where the PMI indicates a precoding matrix, and the precoding matrix has a structure: $W=W_1ZW_2$, where both $W_1$ and Z are block diagonal matrices, and each column of each block matrix $Z_i$ in the matrix Z has a structure:

$$z_{i,k} = (\alpha_{i,k}^2 + \beta_{i,k}^2)^{-\frac{1}{2}}[\alpha_{i,k}e_{i,k}^T \ \beta_{i,k}e^{j\theta_{i,k}}e_{i,k}^T]^T.$$

For the precoding matrix, two column vectors (or referred to as beams) can be separately selected from each block matrix $X_i$ by using the structure of the matrix Z; and phase alignment and weighting are performed on the two column vectors (or beams), where the two column vectors selected from $X_i$ may separately point to two major multipath transmission directions. Therefore, by using the foregoing structure, for each column of an obtained matrix $X_iZ_i$, interference between two major multipath transmission directions can be converted into a wanted signal, and combining gains are obtained, thereby improving system transmission reliability and a system transmission throughput.

Embodiment 3

Figure 4:
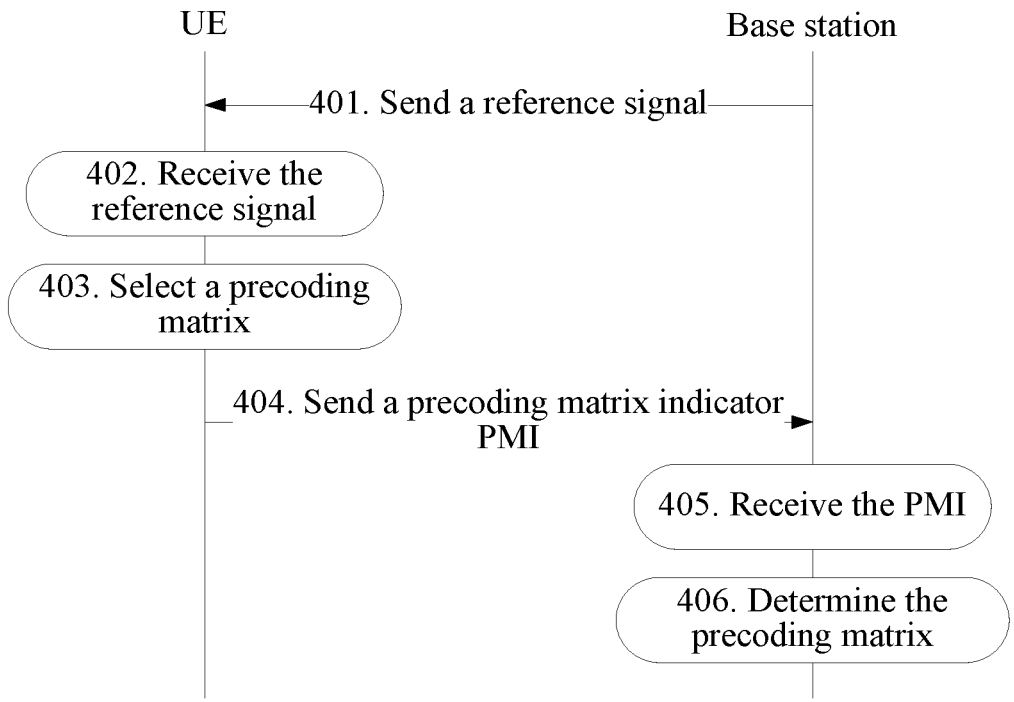
FIG. 4 is a schematic diagram of interaction in a method for reporting channel state information according to an embodiment of the present invention.

Based on the methods for reporting channel state information provided in the foregoing embodiments, the following describes in detail interaction between devices for implementing a method for reporting channel state information provided in this embodiment of the present invention, and as shown in FIG. 4, the method includes:

401: A base station sends a reference signal to user equipment UE.

402: The user equipment receives the reference signal sent by the base station.

403: The user equipment selects, based on the reference signal, a precoding matrix from a codebook, where a precoding matrix W included in the codebook is a product of three matrices being $W_1$, Z, and $W_2$, that is, $W=W_1ZW_2$, where both $W_1$ and Z are block diagonal matrices, $W_1$=diag$\{X_1, \ldots, X_{N_B}\}$, Z=diag$\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T \ \beta_{i,k}e^{j\theta_{i,k}}e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, $\beta_{i,k} \geq 0$; and $X_i$ corresponds to $Z_i$.

404: The user equipment sends a precoding matrix indicator PMI to the base station, where the PMI corresponds to the selected precoding matrix, and is used by the base station to obtain the selected precoding matrix W according to the PMI.

405: The base station receives the precoding matrix indicator PMI sent by the UE.

406: Determine the precoding matrix W in the codebook according to the PMI.

In this embodiment of the present invention, user equipment determines and sends a precoding matrix indicator PMI, where the PMI indicates a precoding matrix, and the precoding matrix has a structure: $W=W_1ZW_2$, where both $W_1$ and Z are block diagonal matrices, and each column of each block matrix 7Z in the matrix $Z_i$ has a structure:

$$z_{i,k} = (\alpha_{i,k}^2 + \beta_{i,k}^2)^{-\frac{1}{2}}[\alpha_{i,k}e_{i,k}^T \ \beta_{i,k}e^{j\theta_{i,k}}e_{i,k}^T]^T.$$

For the precoding matrix, two column vectors (or referred to as beams) can be separately selected from each block matrix $X_i$ by using the foregoing structure; and phase alignment and weighting are performed on the two column vectors (or beams), where the two column vectors selected from $X_i$ may separately point to two major multipath transmission directions. Therefore, by using the foregoing structure, for each column of an obtained matrix $X_iZ_i$, interference between two major multipath transmission directions can be converted into a wanted signal, and combining gains are obtained, thereby improving system transmission reliability and a system transmission throughput.

Embodiment 4

Figure 5:
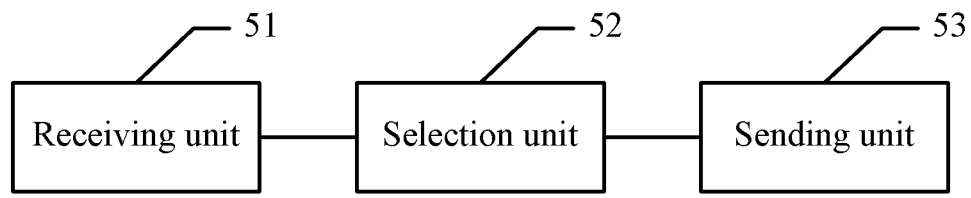
FIG. 5 is a schematic structural diagram of user equipment according to an embodiment of the present invention.

This embodiment of the present invention provides user equipment. As shown in FIG. 5, the user equipment includes: a receiving unit 51, a selection unit 52, and a sending unit 53.

The receiving unit 51 is configured to receive a reference signal sent by a base station.

The selection unit 52 is configured to select, based on the reference signal, a precoding matrix from a codebook, where a precoding matrix W included in the codebook is a product of three matrices being $W_1$, Z, and $W_2$, that is, $W=W_1ZW_2$, where both $W_1$ and Z are block diagonal matrices, $W_1$=diag$\{X_1, \ldots, X_{N_B}\}$, Z=diag$\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}} [\alpha_{i,k} e_{i,k}^T \quad \beta_{i,k} e^{j\theta_{i,k}} e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, $\alpha_{i,k} \geq 0$; and $X_i$ corresponds to $Z_i$.

The sending unit 53 is configured to send a precoding matrix indicator PMI to the base station, where the PMI corresponds to the selected precoding matrix, and is used by the base station to obtain the selected precoding matrix W according to the PMI.

Optionally, the selection unit 52 is specifically configured to select, based on the reference signal, the precoding matrix from a codebook subset, where the codebook subset is a subset predefined, or notified by the base station, or reported by the user equipment.

Preferably, the codebook subsets share at least one same matrix subset of the following matrix subsets: subsets of a matrix $W_1$, a matrix $W_1Z$, a matrix $W_2$, a matrix $ZW_2$, and a matrix Z.

Optionally, the sending unit 53 may be specifically configured to send a first precoding matrix indicator $PMI_1$ and a second precoding matrix indicator $PMI_2$ to the base station, where the $PMI_1$ is used to indicate the matrix $W_1Z$, and the $PMI_2$ is used to indicate the matrix $W_2$; or send a third precoding matrix indicator $PMI_3$ and a fourth precoding matrix indicator $PMI_4$ to the base station, where the $PMI_3$ is used to indicate the matrix $W_1$, and the $PMI_4$ is used to indicate the matrix $ZW_2$; or send a second precoding matrix indicator $PMI_2$, a third precoding matrix indicator $PMI_3$, and a fifth precoding matrix indicator $PMI_5$ to the base station, where the $PMI_5$ is used to indicate the matrix Z.

Optionally, the sending unit 53 may be specifically configured to send the $PMI_1$ to the base station according to a first period; and send the $PMI_2$ to the base station according to a second period, where the first period is greater than the second period; or send the $PMI_3$ to the base station according to a third period; and send the $PMI_4$ to the base station according to a fourth period, where the third period is greater than the fourth period; or send the $PMI_2$ to the base station according to a second period;

send the $PMI_3$ to the base station according to a third period; and send the $PMI_5$ to the base station according to a fifth period, where the third period is less than the second period and the fifth period.

The sending unit 53 may further be specifically configured to send the $PMI_1$ to the base station according to a first frequency domain granularity; and send the $PMI_2$ to the base station according to a second frequency domain granularity, where the first frequency domain granularity is greater than the second frequency domain granularity, for example, send a wideband $PMI_1$ and a sub-band $PMI_2$ to the base station; or send the $PMI_3$ to the base station according to a third frequency domain granularity; and send the $PMI_4$ to the base station according to a fourth frequency domain granularity, where the third frequency domain granularity is greater than the fourth frequency domain granularity, for example, send a wideband $PMI_3$ and a sub-band $PMI_4$ to the base station; or send the $PMI_2$ to the base station according to a second frequency domain granularity;

send the $PMI_3$ to the base station according to a third frequency domain granularity; and send the $PMI_5$ to the base station according to a fifth frequency domain granularity, where the third frequency domain granularity is less than the second frequency domain granularity and the fifth frequency domain granularity, for example, send a wideband $PMI_2$, a wideband $PMI_5$, and a sub-band $PMI_3$ to the base station.

It should be noted that, the sizes of the foregoing wideband and sub-band may vary with the size of a system bandwidth. For example, in a 10 MHz LTE system, the wideband may include 50 physical resource blocks RBs, and the size of the sub-band may be 6 consecutive RBs; and in a 5 MHz LTE system, the wideband may include 25 RBs, and the size of the sub-band may be 3 consecutive RBs.

Optionally, the block matrix $X_i=[X_{i,1}\ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Further, each column of the matrix $X_{i,j}$, j=1, 2 is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

Optionally, the block matrix $X_i=[X_{i,1}\ X_{i,2}]$, where the matrix $X_{i,j}$ is a Kronecker product of two matrices being $A_{i,j}$ and $B_{i,j}$, and j=1, 2.

Further, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Optionally, $W_1$ is an identity matrix.

Optionally, a column vector in the matrix $W_2$ has a structure: $y_n = \gamma^{-1}[e_n^T\ e^{j\theta_n}e_n^T]^T$, where $e_n$ represents a selection vector, where in the vector, the $n^{th}$ element is 1 and all other elements are 0; $\theta_n$ is a phase shift; and $\gamma$ is a positive constant.

Figure 6:
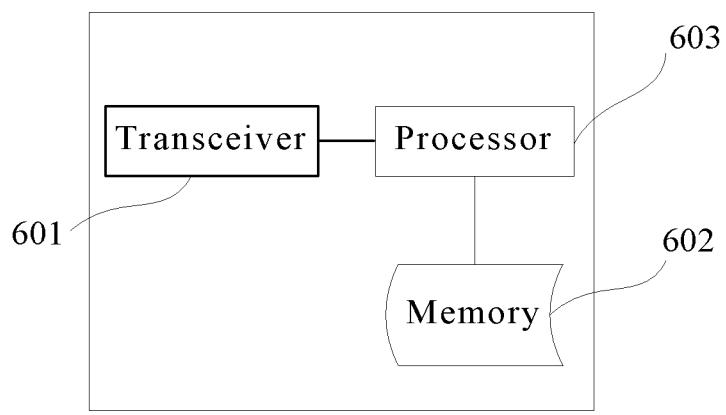
FIG. 6 is a schematic structural diagram of another user equipment according to an embodiment of the present invention.

This embodiment of the present invention further provides user equipment. As shown in FIG. 6, the user equipment includes: a transceiver 601, a memory 602, and a processor 603. Certainly, the user equipment may further include common-purpose components such as an antenna and an input/output apparatus, which is not limited herein in this embodiment of the present invention.

The memory 602 stores a set of program code, and the processor 603 is configured to invoke the program code stored in the memory 602, to perform the following operations: receiving, by using the transceiver 601, a reference signal sent by a base station; selecting, based on the reference signal, a precoding matrix from a codebook, where a precoding matrix W included in the codebook is a product of three matrices being $W_1$, Z, and $W_2$, that is, $W=W_1ZW_2$, where both $W_1$ and Z are block diagonal matrices, $W_1=\text{diag}\{X_1, \ldots, X_{N_B}\}$, $Z=\text{diag}\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T\ \beta_{i,k}e^{j\theta_{i,k}}e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, $\beta_{i,k} \geq 0$; and $X_i$ corresponds to $Z_i$; and sending a precoding matrix indicator PMI to the base station by using the transceiver 601, where the PMI corresponds to the selected precoding matrix, and is used by the base station to obtain the selected precoding matrix W according to the PMI.

The selecting, based on the reference signal, a precoding matrix from a codebook specifically includes:

selecting, based on the reference signal, the precoding matrix from a codebook subset, where the codebook subset is a subset predefined, or notified by the base station, or reported by the user equipment.

Optionally, the codebook subsets share at least one same matrix subset of the following matrix subsets: subsets of a matrix $W_1$, a matrix $W_1Z$, a matrix $W_2$, a matrix $ZW_2$, and a matrix Z.

Optionally, the sending a precoding matrix indicator PMI to the base station by using the transceiver 601 specifically includes:

sending a first precoding matrix indicator $PMI_1$ and a second precoding matrix indicator $PMI_2$ to the base station, where the $PMI_1$ is used to indicate the matrix $W_1Z$, and the $PMI_2$ is used to indicate the matrix $W_2$; or sending a third precoding matrix indicator $PMI_3$ and a fourth precoding matrix indicator $PMI_4$ to the base station, where the $PMI_3$ is used to indicate the matrix $W_1$, and the $PMI_4$ is used to indicate the matrix $ZW_2$; or sending a second precoding matrix indicator $PMI_2$, a third precoding matrix indicator $PMI_3$, and a fifth precoding matrix indicator $PMI_5$ to the base station, where the $PMI_5$ is used to indicate the matrix Z.

Optionally, the sending a precoding matrix indicator PMI to the base station by using the transceiver 601 specifically includes:

sending the $PMI_1$ to the base station according to a first period; and sending the $PMI_2$ to the base station according to a second period, where the first period is greater than the second period; or sending the $PMI_3$ to the base station according to a third period; and sending the $PMI_4$ to the base station according to a fourth period, where the third period is greater than the fourth period; or sending the $PMI_2$ to the base station according to a second period;

sending the $PMI_3$ to the base station according to a third period; and sending the $PMI_5$ to the base station according to a fifth period, where the third period is less than the second period and the fifth period.

Optionally, the sending a precoding matrix indicator PMI to the base station by using the transceiver 601 specifically includes:

sending the $PMI_1$ to the base station according to a first frequency domain granularity; and sending the $PMI_2$ to the base station according to a second frequency domain granularity, where the first frequency domain granularity is greater than the second frequency domain granularity, for example, sending a wideband $PMI_1$ and a sub-band $PMI_2$ to the base station; or sending the $PMI_3$ to the base station according to a third frequency domain granularity; and sending the $PMI_4$ to the base station according to a fourth frequency domain granularity, where the third frequency domain granularity is greater than the fourth frequency domain granularity, for example, sending a wideband $PMI_3$ and a sub-band $PMI_4$ to the base station; or sending the $PMI_2$ to the base station according to a second frequency domain granularity;

sending the $PMI_3$ to the base station according to a third frequency domain granularity; and sending the $PMI_5$ to the base station according to a fifth frequency domain granularity, where the third frequency domain granularity is less than the second frequency domain granularity and the fifth frequency domain granularity, for example, sending a wideband $PMI_2$, a wideband $PMI_5$, and a sub-band $PMI_3$ to the base station.

It should be noted that, the sizes of the foregoing wideband and sub-band may vary with the size of a system bandwidth. For example, in a 10 MHz LTE system, the wideband may include 50 physical resource blocks RBs, and the size of the sub-band may be 6 consecutive RBs; and in a 5 MHz LTE system, the wideband may include 25 RBs, and the size of the sub-band may be 3 consecutive RBs.

Optionally, the block matrix $X_i=[X_{i,1}\ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Further, each column of the matrix $X_{i,j}$, j=1, 2 is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

Optionally, the block matrix $X_i=[X_{i,1}\ X_{i,2}]$, where the matrix $X_{i,j}$ is a Kronecker product of two matrices being $A_{i,j}$ and $B_{i,j}$ and j=1, 2.

Further, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Optionally, $W_1$ is an identity matrix.

Optionally, a column vector in the matrix $W_2$ has a structure: $y_n = \gamma^{-1}[e_n^T\ e^{j\theta_n}e_n^T]^T$, where $e_n$ represents a selection vector, where in the vector, the $n^{th}$ element is 1 and all other elements are 0; $\theta_n$ is a phase shift; and $\gamma$ is a positive constant.

It should be noted that, apart from the precoding matrix having the foregoing structure, the codebook may further include other precoding matrices, so as to meet requirements of other scenarios, which is not limited herein.

In this embodiment of the present invention, user equipment determines and sends a precoding matrix indicator PMI, where the PMI indicates a precoding matrix, and the precoding matrix has a structure: $W=W_1ZW_2$, where both $W_1$ and Z are block diagonal matrices, and each column of each block matrix 7Z in the matrix Z has a structure:

$$z_{i,k} = (\alpha_{i,k}^2 + \beta_{i,k}^2)^{-\frac{1}{2}}[\alpha_{i,k}e_{i,k}^T\ \beta_{i,k}e^{j\theta_{i,k}}e_{i,k}^T]^T.$$

For the precoding matrix, two column vectors (or referred to as beams) can be separately selected from each block matrix $X_i$ by using the foregoing structure; and phase alignment and weighting are performed on the two column vectors (or beams), where the two column vectors selected from $X_i$ may separately point to two major multipath transmission directions. Therefore, by using the foregoing structure, for each column of an obtained matrix $X_iZ_i$, interference between two major multipath transmission directions can be converted into a wanted signal, and combining gains are obtained, thereby improving system transmission reliability and a system transmission throughput.

Embodiment 5

Figure 7:
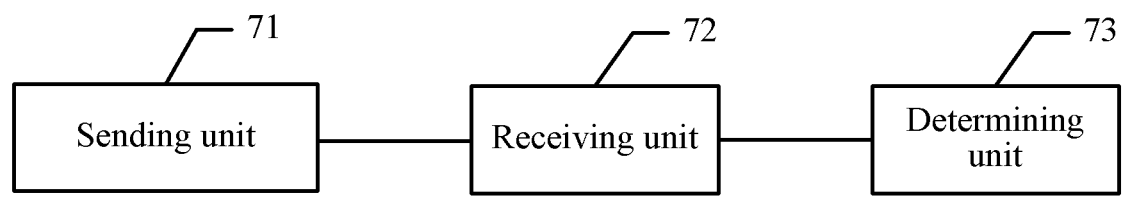
FIG. 7 is a schematic structural diagram of a base station according to an embodiment of the present invention.

This embodiment of the present invention provides a base station. As shown in FIG. 7, the base station includes: a sending unit 71, a receiving unit 72, and a determining unit 73.

The sending unit 71 is configured to send a reference signal to user equipment UE.

The receiving unit 72 is configured to receive a precoding matrix indicator PMI sent by the UE.

The determining unit 73 is configured to determine a precoding matrix W in a codebook according to the PMI, where the precoding matrix W is a product of three matrices being $W_1$, Z, and $W_2$, that is, $W=W_1ZW_2$, where both $W_1$ and Z are block diagonal matrices, $W_1$=diag$\{X_1, \ldots, X_{N_B}\}$, Z=diag$\{Z_1, \ldots, Z_{N_B}\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T\ \beta_{i,k}e^{j\theta_{i,k}}e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, $\beta_{i,k} \geq 0$; and $X_i$ corresponds to $Z_i$.

Optionally, the determining unit 73 is specifically configured to determine the precoding matrix in a codebook subset according to the PMI, where the codebook subset is a subset predefined, or reported by the user equipment, or notified by the base station.

The codebook subsets share at least one same matrix subset of the following matrix subsets: subsets of a matrix $W_1$, a matrix $W_1Z$, a matrix $W_2$, a matrix $ZW_2$, and a matrix Z.

Optionally, the receiving unit 72 is specifically configured to:

receive a first precoding matrix indicator $PMI_1$ and a second precoding matrix indicator $PMI_2$ that are sent by the UE, where the $PMI_1$ is used to indicate the matrix $W_1Z$, and the $PMI_2$ is used to indicate the matrix $W_2$;

or receive a third precoding matrix indicator $PMI_3$ and a fourth precoding matrix indicator $PMI_4$ that are sent by the UE, where the $PMI_3$ is used to indicate the matrix $W_1$, and the $PMI_4$ is used to indicate the matrix $ZW_2$;

or receive a second precoding matrix indicator $PMI_2$, a third precoding matrix indicator $PMI_3$, and a fifth precoding matrix indicator $PMI_5$ that are sent by the UE, where the $PMI_5$ is used to indicate the matrix Z.

Optionally, the receiving unit 72 is specifically configured to:

receive, according to a first period, the $PMI_1$ sent by the UE; and receive, according to a second period, the $PMI_2$ sent by the UE, where the first period is greater than the second period; or receive, according to a third period, the $PMI_3$ sent by the UE; and receive, according to a fourth period, the $PMI_4$ sent by the UE, where the third period is greater than the fourth period; or receive, according to a second period, the $PMI_2$ sent by the UE;

receive, according to a third period, the $PMI_3$ sent by the UE; and receive, according to a fifth period, the $PMI_5$ sent by the UE, where the third period is less than the second period and the fifth period.

Optionally, the receiving unit 72 is specifically configured to:

receive, according to a first frequency domain granularity, the $PMI_1$ sent by the UE; and receive, according to a second frequency domain granularity, the $PMI_2$ sent by the UE, where the first frequency domain granularity is greater than the second frequency domain granularity, for example, a wideband $PMI_1$ and a sub-band $PMI_2$ are sent to the base station; or receive, according to a third frequency domain granularity, the $PMI_3$ sent by the UE; and receive, according to a fourth frequency domain granularity, the $PMI_4$ sent by the UE, where the third frequency domain granularity is greater than the fourth frequency domain granularity, for example, a wideband $PMI_3$ and a sub-band $PMI_4$ are sent to the base station; or receive, according to a second frequency domain granularity, the $PMI_2$ sent by the UE;

receive, according to a third frequency domain granularity, the $PMI_3$ sent by the UE; and receive, according to a fifth frequency domain granularity, the $PMI_5$ sent by the UE, where the third frequency domain granularity is less than the second frequency domain granularity and the fifth frequency domain granularity, for example, a wideband $PMI_2$, a wideband $PMI_5$, and a sub-band $PMI_3$ are sent to the base station.

It should be noted that, the sizes of the foregoing wideband and sub-band may vary with the size of a system bandwidth. For example, in a 10 MHz LTE system, the wideband may include 50 physical resource blocks RBs, and the size of the sub-band may be 6 consecutive RBs; and in a 5 MHz LTE system, the wideband may include 25 RBs, and the size of the sub-band may be 3 consecutive RBs.

Optionally, the block matrix $X_i=[X_{i,1}\ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Further, each column of the matrix $X_{i,j}$ is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

Optionally, the block matrix $X_i=[X_{i,1}\ X_{i,2}]$, where the matrix $X_{i,j}$ is a Kronecker product of two matrices being $A_{i,j}$ and $B_{i,j}$, and j=1, 2.

Specifically, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Optionally, $W_1$ is an identity matrix.

Optionally, a column vector in the matrix $W_2$ has a structure: $y_n=\gamma^{-1}[e_n^T\ e^{j\Theta_n}e_n^T]^T$, where $e_n$ represents a selection vector, where in the vector, the $n^{th}$ element is 1 and all other elements are 0; $\theta_n$ is a phase shift; and $\gamma$ is a positive constant.

Figure 8:
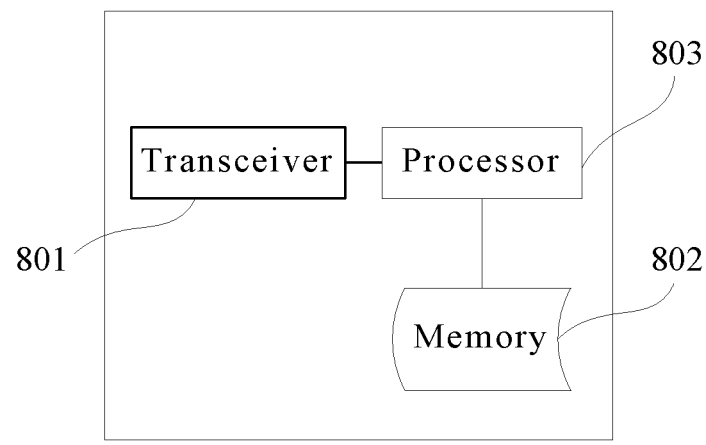
FIG. 8 is a schematic structural diagram of another base station according to an embodiment of the present invention.

This embodiment of the present invention further provides a base station. As shown in FIG. 8, the base station includes: a transceiver 801, a memory 802, and a processor 803. Certainly, the base station may further include common-purpose components such as an antenna and an input/output apparatus, which is not limited herein in this embodiment of the present invention.

The memory 802 stores a set of program code, and the processor 803 is configured to invoke the program code stored in the memory 802, to perform the following operations: sending a reference signal to user equipment UE by using the transceiver 801; when the user equipment reports a PMI, receiving, by using the transceiver 801, the precoding matrix indicator PMI sent by the UE; and determining a precoding matrix W in a codebook according to the PMI, where the precoding matrix W is a product of three matrices being $W_1$, Z, and $W_2$, that is, $W=W_1ZW_2$, where both $W_1$ and Z are block diagonal matrices, $W_1$=diag $\{X_1, \ldots, X_{N_B}\}$, Z=diag$\{Z_1, \ldots, Z_N\}$, each of $W_1$ and Z includes at least one block matrix, that is, $N_B \geq 1$, and each column of each block matrix $Z_i$ in the matrix Z has the following structure:

$$z_{i,k} = (\alpha_{i,k}^2 + \beta_{i,k}^2)^{-\frac{1}{2}}[\alpha_{i,k}e_{i,k}^T\ \beta_{i,k}e^{j\theta_{i,k}}e_{i,k}^T]^T$$

where $[\ ]^T$ represents matrix transposition; $e_{i,k}$ represents an $n_i \times 1$ selection vector, where in the vector, the $k^{th}$ element is 1 and all other elements are 0, and $n_i$ is a half of a column quantity of a block matrix $X_i$; $\theta_{i,k}$ is a phase shift, $\alpha_{i,k} \geq 0$, $\beta_{i,k} \geq 0$; and $X_i$ corresponds to $Z_i$.

The determining a precoding matrix W in a codebook according to the PMI specifically includes: determining the precoding matrix in a codebook subset according to the PMI, where the codebook subset is a subset predefined, or reported by the user equipment, or notified by the base station.

The codebook subsets share at least one same matrix subset of the following matrix subsets: subsets of a matrix $W_1$, a matrix $W_1Z$, a matrix $W_2$, a matrix $ZW_2$, and a matrix Z.

The receiving the PMI by using the transceiver 801 may specifically include: receiving a first precoding matrix indicator $PMI_1$ and a second precoding matrix indicator $PMI_2$ that are sent by the UE, where the $PMI_1$ is used to indicate the matrix $W_1Z$, and the $PMI_2$ is used to indicate the matrix $W_2$;

or receiving a third precoding matrix indicator $PMI_3$ and a fourth precoding matrix indicator $PMI_4$ that are sent by the UE, where the $PMI_3$ is used to indicate the matrix $W_1$, and the $PMI_4$ is used to indicate the matrix $ZW_2$;

or receiving a second precoding matrix indicator $PMI_2$, a third precoding matrix indicator $PMI_3$, and a fifth precoding matrix indicator $PMI_5$ that are sent by the UE, where the $PMI_5$ is used to indicate the matrix Z.

The receiving the PMI by using the transceiver 801 may specifically include: receiving, according to a first period, the $PMI_1$ sent by the UE; and receiving, according to a second period, the $PMI_2$ sent by the UE, where the first period is greater than the second period; or receiving, according to a third period, the $PMI_3$ sent by the UE; and receiving, according to a fourth period, the $PMI_4$ sent by the UE, where the third period is greater than the fourth period; or receiving, according to a second period, the $PMI_2$ sent by the UE;

receiving, according to a third period, the $PMI_3$ sent by the UE; and receiving, according to a fifth period, the $PMI_5$ sent by the UE, where the third period is less than the second period and the fifth period.

The receiving the PMI by using the transceiver 801 may further specifically include: receiving, according to a first frequency domain granularity, the $PMI_1$ sent by the UE; and receiving, according to a second frequency domain granularity, the $PMI_2$ sent by the UE, where the first frequency domain granularity is greater than the second frequency domain granularity, for example, receiving a wideband $PMI_1$ and a sub-band $PMI_2$ that are sent by the UE; or receiving, according to a third frequency domain granularity, the $PMI_3$ sent by the UE; and receiving, according to a fourth frequency domain granularity, the $PMI_4$ sent by the UE, where the third frequency domain granularity is greater than the fourth frequency domain granularity, for example, receiving a wideband $PMI_3$ and a sub-band $PMI_4$ that are sent by the UE; or receiving, according to a second frequency domain granularity, the $PMI_2$ sent by the UE;

receiving, according to a third frequency domain granularity, the $PMI_3$ sent by the UE; and receiving, according to a fifth frequency domain granularity, the $PMI_5$ sent by the UE, where the third frequency domain granularity is less than the second frequency domain granularity and the fifth frequency domain granularity, for example, receiving a wideband $PMI_2$, a wideband $PMI_5$, and a sub-band $PMI_3$ that are sent by the UE.

It should be noted that, the sizes of the foregoing wideband and sub-band may vary with the size of a system bandwidth. For example, in a 10 MHz LTE system, the wideband may include 50 physical resource blocks RBs, and the size of the sub-band may be 6 consecutive RBs; and in a 5 MHz LTE system, the wideband may include 25 RBs, and the size of the sub-band may be 3 consecutive RBs.

The block matrix $X_i = [X_{i,1}\ X_{i,2}]$, where each column of the matrix $X_{i,j}$ is selected from columns of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Further, each column of the matrix $X_{i,j}$ is separately selected from columns of different Householder matrices, different discrete Fourier transform matrices, different Hadamard matrices, different rotated Hadamard matrices, or different precoding matrices in an LTE R8 system 2-antenna or 4-antenna codebook or in an LTE R10 system 8-antenna codebook.

Optionally, the block matrix $X_i = [X_{i,1}\ X_{i,2}]$, where the matrix $X_{i,j}$ is a Kronecker product of two matrices being $A_{i,j}$ and $B_{i,j}$ and j=1, 2.

Specifically, columns of the matrix $X_{i,1}$ and the matrix $X_{i,2}$ are column vectors of a Householder matrix, a discrete Fourier transform matrix, a Hadamard matrix, a rotated Hadamard matrix, or a precoding matrix in an LTE R8 system 2-antenna or 4-antenna codebook or in an LTE R10 system 8-antenna codebook.

Optionally, $W_1$ is an identity matrix.

Optionally, a column vector in the matrix $W_2$ has a structure: $y_n = \gamma^{-1}[e_n^T\ e^{j\theta_n}e_n^T]^T$, where e, represents a selection vector, where in the vector, the $n^{th}$ element is 1 and all other elements are 0; $\theta_n$ is a phase shift; and $\gamma$ is a positive constant.

It should be noted that, apart from the precoding matrix having the foregoing structure, the codebook may further include other precoding matrices, so as to meet requirements of other scenarios, which is not limited herein.

In this embodiment of the present invention, after receiving a precoding matrix indicator PMI reported by user equipment, a base station determines a precoding matrix according to the PMI, where the precoding matrix has a structure: $W = W_1 Z W_2$, where both $W_1$ and Z are block diagonal matrices, and each column of each block matrix Z in the matrix Z has a structure:

$$z_{i,k} = (\alpha_{i,k}^2 + \beta_{i,k}^2)^{-\frac{1}{2}} [\alpha_{i,k} e_{i,k}^T\ \beta_{i,k} e^{j\theta_{i,k}} e_{i,k}^T]^T.$$

For the precoding matrix, two column vectors (or referred to as beams) can be separately selected from each block matrix $X_i$ by using the foregoing structure; and phase alignment and weighting are performed on the two column vectors (or beams), where the two column vectors selected from $X_i$ may separately point to two major multipath transmission directions. Therefore, by using the foregoing structure, for each column of an obtained matrix $X_i Z_i$, interference between two major multipath transmission directions can be converted into a wanted signal, and combining gains are obtained, thereby improving system transmission reliability and a system transmission throughput.

It should be noted that, for specific descriptions of some function modules in the base station and the user equipment that are provided in the embodiments of the present invention, reference may be made to corresponding content in the method embodiments, and details are not described again in this embodiment.

As seen from the descriptions of the foregoing embodiments, it may be clearly understood by a person skilled in the art that, for the purpose of convenient and brief description, division of the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus comprising:
a storage medium including executable instructions; and
a processor;
wherein the executable instructions, when executed by the processor, cause the apparatus to:
receive a reference signal from a base station;
select a precoding matrix W from a codebook based on the reference signal, wherein the precoding matrix W meets $W=W_1ZW_2$, wherein
$W_1$ is a block diagonal matric and meets $W_1=\{X_1, \ldots, X_{N_B}\}$, $N_B \geq 1$;
Z is a block diagonal matrix and meets $Z=\text{diag}\{Z_1, \ldots, Z_{N_B}\}$, wherein each column $Z_{i,k}$ of each block matrix $Z_1$ in the matrix Z meets $$z_{i,k} = (\alpha_{i,k}^2 + \beta_{i,k}^2)^{-\frac{1}{2}} [\alpha_{i,k} e_{i,k1}^T \ \beta_{i,k} e^{j\theta_{i,k}} e_{i,k2}^T]^T,$$

wherein i is an index variable of the block matrix $Z_1$, k is an index variable of the column $Z_{i,k}$, $[\ ]^T$ represents matrix transposition, $e_{i,k1}$ is an n×1 selection vector in which the k1$^{th}$ element is 1 and all other elements are 0, $e_{i,k2}$ is an $n_i$×1 selection vector in which the k2$^{th}$ element is 1 and all other elements are 0, $n_i$ is a half of a column quantity of the block matrix $X_i$, $\theta^{i,k}$ is a phase shift, $\alpha, \geq 0$, and $\beta_{i,k} \geq 0$; and
$W_2$ is a matrix used to select one column vectors in the matrix $W_1Z$ or to perform weighting combination on more than one column vectors in the matrix $W_1Z$; and
send a precoding matrix indicator (PMI) to the base station, wherein the PMI corresponds to the selected precoding matrix W.

2. The apparatus according to claim 1, wherein the codebook is a codebook subset notified by the base station to user equipment.

3. The apparatus according to claim 1, wherein the block matrix $X_i$ meets $X^i=[X_{i,1} \ X_{i,2}]$, wherein each column of the matrix $X^{i,j}$ is a column of a discrete Fourier transform matrix, and j=1,2, wherein i and j are index variables of the matrix $X_{i,j}$.

4. The apparatus according to claim 1, wherein the block matrix $X_i$ meets $X_i=[X_{i,1} \ X_{i,2}]$, wherein the matrix $X_{i,1}$ is a Kronecker product of two matrices $A_{i,j}$ and $B_{i,j}$, and j=1, 2, wherein i and j are index variables of the matrix $X_{i,j}$.

5. The apparatus according to claim 1, wherein $W_1$ is an identity matrix.

6. A apparatus comprising:
a storage medium including executable instructions; and
a processor;
wherein the executable instructions, when executed by the processor, cause the apparatus to:
send a reference signal to a user equipment (UE);
receive a precoding matrix indicator (PMI) from the UE; and
determine a precoding matrix W in a codebook according to the PMI, wherein the precoding matrix W meets $W=W_1ZW_2$, wherein
$W_1$ is a block diagonal matric and meets $W_1=\text{diag}\{X_1, \ldots, X_{N_B}\}$, $N_B \geq 1$;
Z is a block diagonal matrix and meets $Z=\text{diag}\{Z_1, \ldots, Z_{N_B}\}$, wherein each column $Z_{i,k}$ of each block matrix $Z_i$ in the matrix Z meets $$z_{i,k} = (\alpha_{i,k}^2 + \beta_{i,k}^2)^{-\frac{1}{2}} [\alpha_{i,k} e_{i,k1}^T \ \beta_{i,k} e^{j\theta_{i,k}} e_{i,k2}^T]^T,$$

wherein i is an index variable of the block matrix $Z_i$, k is an index variable of the column $Z_{i,k}$, $[\ ]^T$ represents matrix transposition, $e_{i,k1}$ is an $n_i$×1 selection vector in which the k1$^{th}$ element is 1 and all other elements are 0, $e_{i,k2}$ is an $n_i$×1 selection vector in which the k2$^{th}$ element is 1 and all other elements are 0, and $n_i$ is a half of a column quantity of the block matrix $X_i$, $\theta_{i,k}$ is a phase shift, $\alpha_{i,k} \geq 0$ and $\beta_{i,k} \geq 0$; and
$W_2$ is a matrix used to select one column vectors in the matrix $W_iZ$ or to perform weighting combination on more than one column vectors in the matrix $W_iZ$.

7. The apparatus according to claim 6, wherein the codebook is a codebook subset notified by a base station to the user equipment.

8. The apparatus according to claim 6, wherein the block matrix $X_i$ meets $X_i=[X_{i,1} \ X_{i,2}]$, wherein each column of the matrix $X_{i,j}$ is selected from a column of a discrete Fourier transform matrix, and j=1,2, wherein i and j are index variables of the matrix $X_{i,j}$.

9. The apparatus according to claim 6, wherein the block matrix $X_i$ meets $X_i=[X_{i,1} \ X_{i,2}]$, wherein the matrix $X_{i,j}$ is a Kronecker product of two matrices $A_{i,j}$ and $B_{i,j}$, and j=1, 2, wherein i and j are index variables of the matrix $X_{i,j}$.

10. The apparatus according to claim 6, wherein $W_1$ is an identity matrix.

11. A method comprising:
receiving, by user equipment (UE), a reference signal from a base station;
selecting, by the UE, a precoding matrix W from a codebook based on the reference signal, wherein the precoding matrix W meets $W=W_1ZW_2$, wherein
$W_1$ is a block diagonal matrix and meets $W_1=\text{diag}\{X_1, \ldots, X_{N_B}\}$, $N_B \geq 1$;

Z is a block diagonal matrix and meets Z=diag $\{Z_1, \ldots, Z_{N_B}\}$, wherein each column $Z_{i,k}$ of each block matrix $Z_i$ in the matrix Z meets $$z_{i,k} = (\alpha_{i,k}^2 + \beta_{i,k}^2)^{-\frac{1}{2}} \left[ \alpha_{i,k} e_{i,k1}^T \quad \beta_{i,k} e^{j\theta_{i,k}} e_{i,k2}^T \right]^T,$$

wherein i is an index variable of the matrix $Z_i$, k is an index variable of the column $Z_{i,k}$, $[\;]^T$ represents matrix transposition, $e_{i,k1}$ is an $n_i \times 1$ selection vector in which the $k1^{th}$ element is 1 and all other elements are 0, $e_{i,k2}$ is an $n_i \times 1$ selection vector in which the $k2^{th}$ element is 1 and all other elements are 0, $n_i$ is a half of a column quantity of the block matrix $X_i$, $\theta_{i,k}$ is a phase shift, $\alpha_{i,k} \geq 0$, and $\beta_{i,k} \geq 0$; and $W_2$ is a matrix used to select one column vector in a matrix $W_i Z$ or to perform weighting combination on more than one column vectors in the matrix $W_i Z$; and sending, by the UE, a precoding matrix indicator (PMI) to the base station, wherein the PMI corresponds to the selected precoding matrix W.

12. The method according to claim 11, wherein the codebook is a codebook subset notified by the base station to the user equipment.

13. The method according to claim 11, wherein the matrix $X_i$ meets $X_i = [X_{i,1} \; X_{i,2}]$, each column of the matrix $X_{i,j}$ is a column of a discrete Fourier transform matrix, and j=1,2, wherein i and j are index variables of the matrix $X_{i,j}$.

14. The method according to claim 11, wherein the matrix X, meets $X_i = [X_{i,1} \; X_{i,2}]$, the matrix $X_{i,j}$ is a Kronecker product of two matrices $A_{i,j}$ and $B_{i,j}$, and j=1,2, wherein i and j are index variables of the matrix $X_{i,j}$.

15. The method according to claim 11, wherein $W_1$ is an identity matrix.

16. A method comprising:

sending, by a base station, a reference signal to user equipment (UE);

receiving, by the base station, a precoding matrix indicator (PMI) from the UE; and determining, by the base station, a precoding matrix W according to the PMI, wherein the precoding matrix W meets $W = W_1 Z W_2$, wherein $W_1$ is a block diagonal matrix and meets $W_1$=diag $\{X_1, \ldots, X_{N_B}\}$, $N_B \geq 1$;

Z is a block diagonal matrix and meets Z=diag $\{Z_1, \ldots Z_{N_B}\}$, each column $Z_{i,k}$ of each block matrix $Z_i$ in the matrix Z meets $$z_{i,k} = (\alpha_{i,k}^2 + \beta_{i,k}^2)^{-\frac{1}{2}} \left[ \alpha_{i,k} e_{i,k1}^T \quad \beta_{i,k} e^{j\theta_{i,k}} e_{i,k2}^T \right]^T,$$

wherein i is an index variable of the matrix $Z_i$, k is an index variable of the column $Z_{i,k}$, $[\;]^T$ represents matrix transposition, $e_{i,k1}$ is an $n_i \times 1$ selection vector in which the $k1^{th}$ element is 1 and all other elements are 0, $e_{i,k2}$ is an $n_i \times 1$ selection vector in which the $k2^{th}$ element is 1 and all other elements are 0, $n_i$ is a half of a column quantity of the block matrix $X_i$ in the matrix $W_1$, $\theta_{i,k}$ is a phase shift, $\alpha_{i,k} \geq 0$, and $\beta_{i,k} \geq 0$; and $W_2$ is a matrix used to select one column vector in a matrix $W_i Z$ or to perform weighting combination on more than one column vectors in the matrix $W_i Z$.

17. The method according to claim 16, wherein the codebook is a codebook subset notified by the base station to the user equipment.

18. The method according to claim 16, wherein the matrix $X_i$ meets $X_i = [X_{i,1} \; X_{i,2}]$, each column of the matrix $X_{i,j}$ is a column of a discrete Fourier transform matrix, and j=1, 2, wherein i and j are index variables of the matrix $X_{i,j}$.

19. The method according to claim 16, wherein the matrix $X_i$ meets $X_i = [X_{i,1} \; X_{i,2}]$, the matrix $X_{i,j}$ is a Kronecker product of two matrices $A_{i,j}$ and $B_{i,j}$, and j=1,2, wherein i and j are index variables of the matrix $X_{i,j}$.

20. The method according to claim 16, wherein $W_1$ is an identity matrix.

* * * * *